Dec. 15, 1936.   A. B. WINCHELL   2,064,777
PHONOGRAPH
Filed April 26, 1930   16 Sheets-Sheet 1

INVENTOR
ARTHUR B. WINCHELL
BY
ATTORNEY

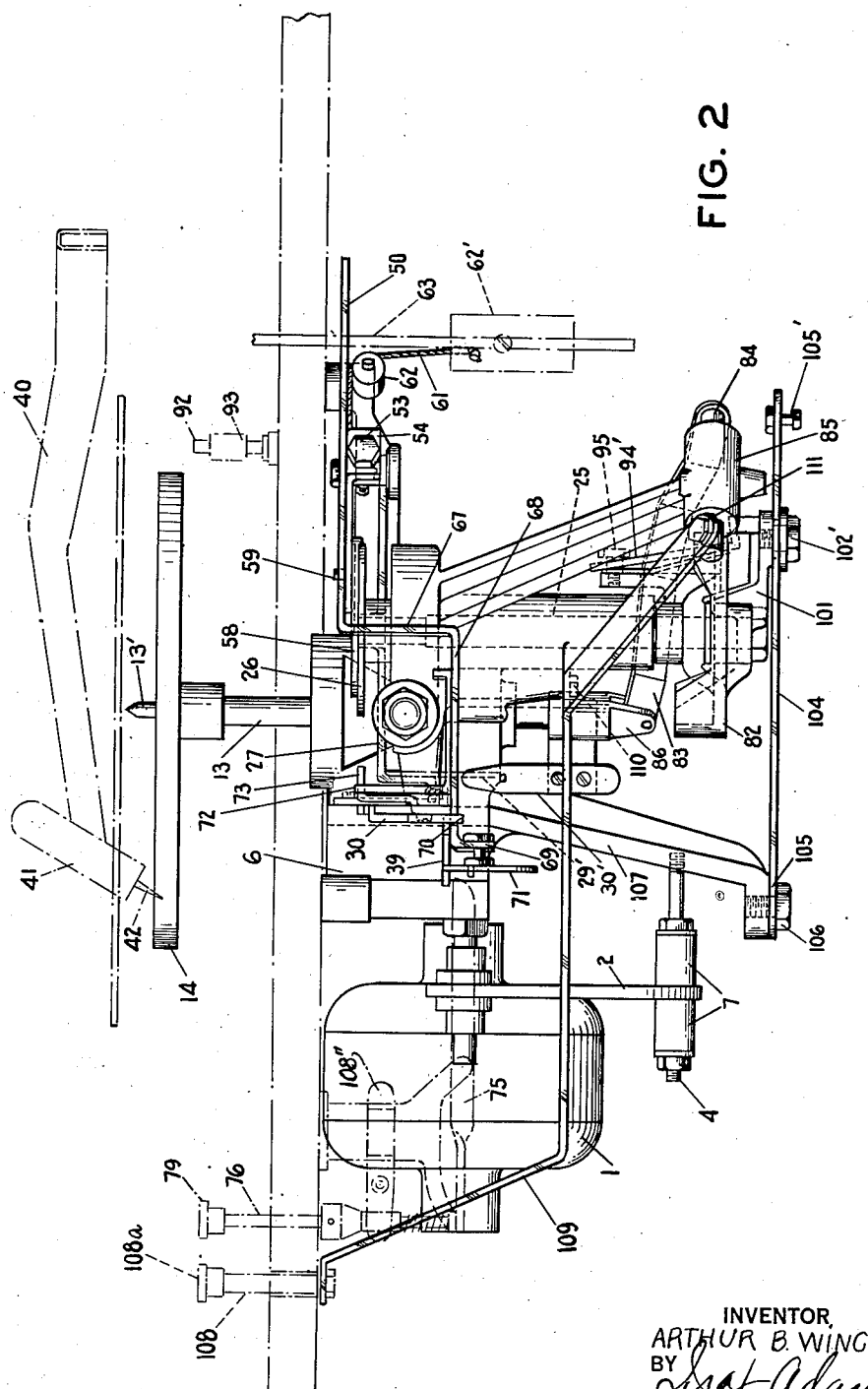

Dec. 15, 1936.  A. B. WINCHELL  2,064,777
PHONOGRAPH
Filed April 26, 1930   16 Sheets-Sheet 3
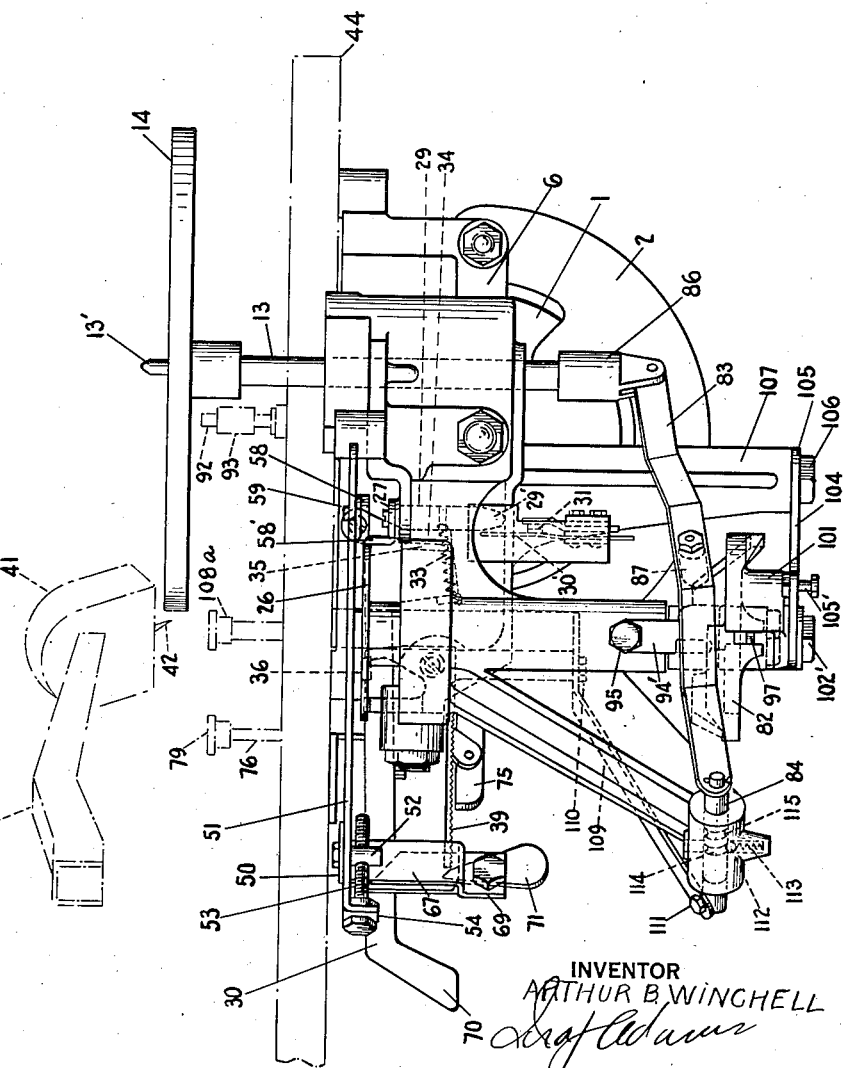
INVENTOR
ARTHUR B. WINCHELL
ATTORNEY

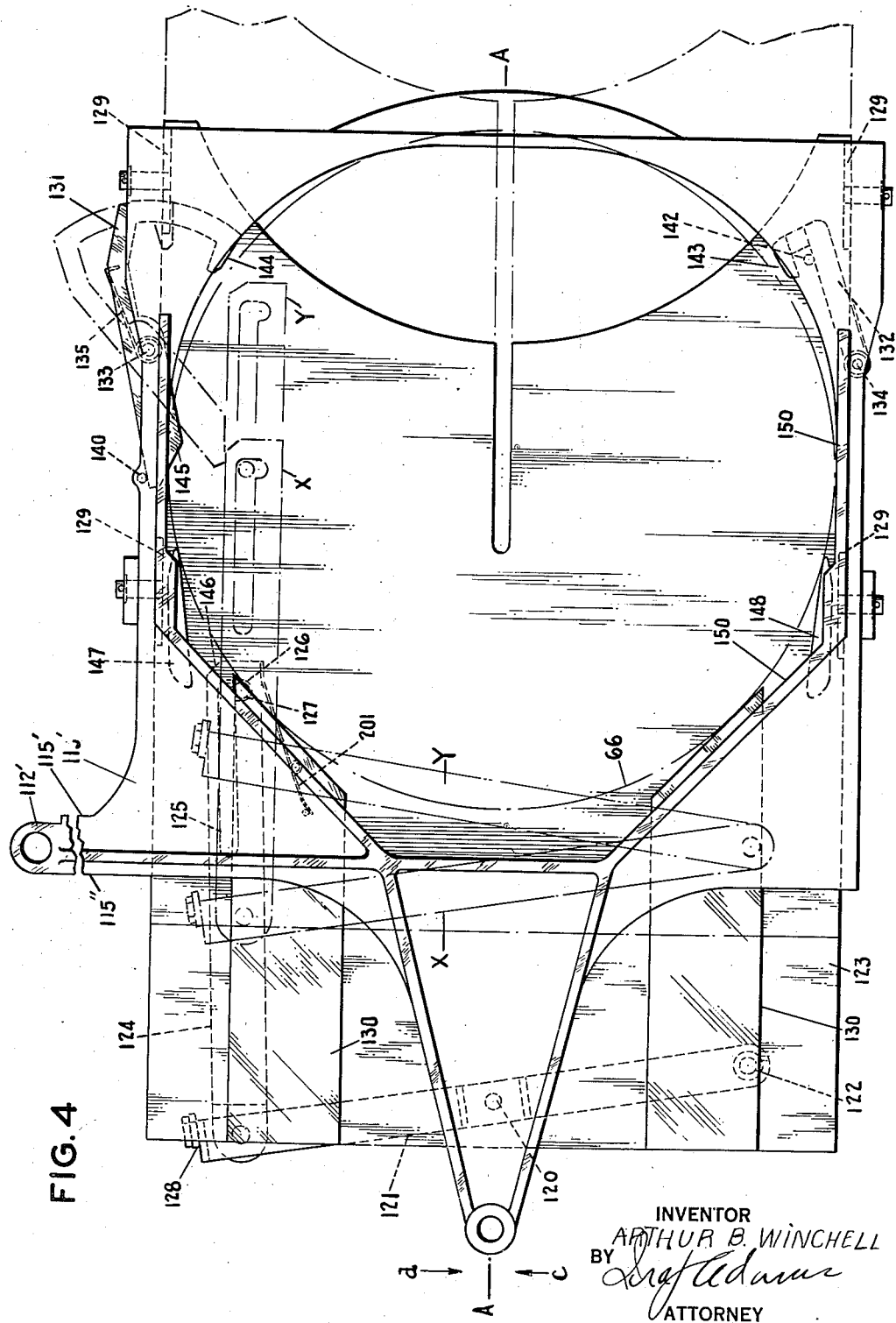

Dec. 15, 1936.  A. B. WINCHELL  2,064,777
PHONOGRAPH
Filed April 26, 1930  16 Sheets-Sheet 5
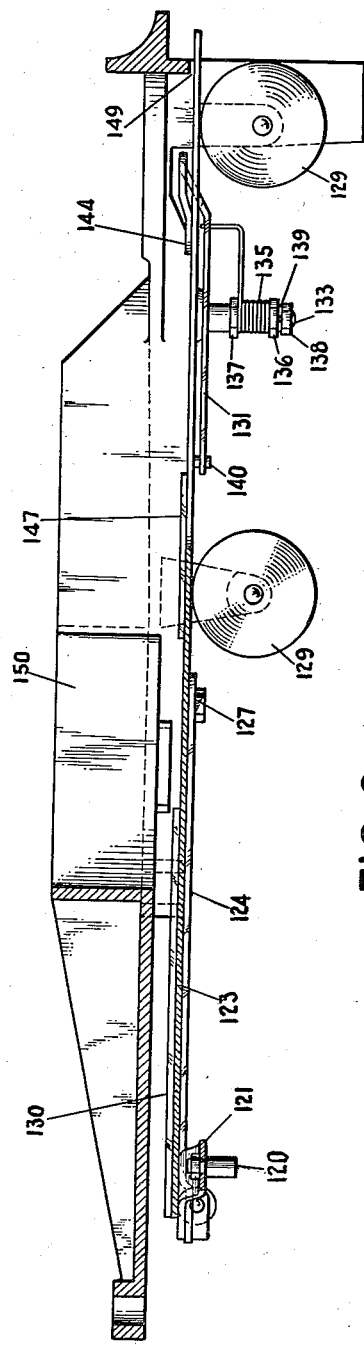
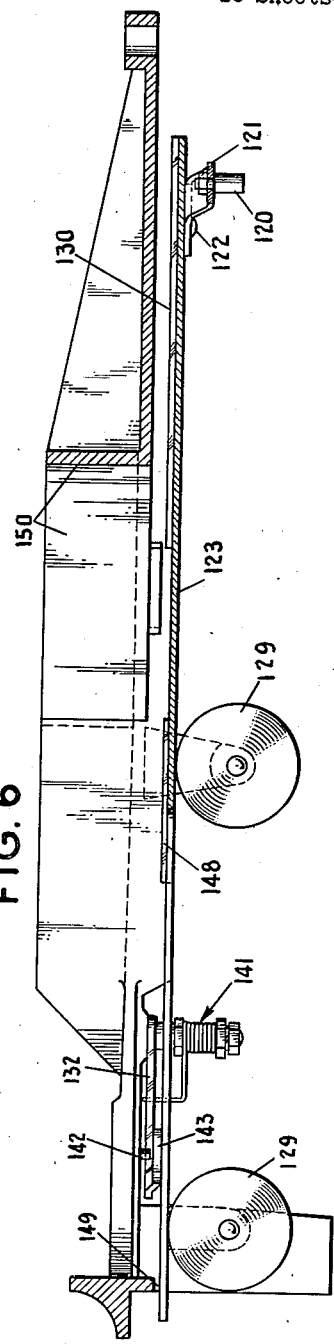
INVENTOR
ARTHUR B. WINCHELL
BY
ATTORNEY Dec. 15, 1936. A. B. WINCHELL 2,064,777
PHONOGRAPH
Filed April 26, 1930 16 Sheets-Sheet 7

INVENTOR
ARTHUR B. WINCHELL
BY
ATTORNEY

Dec. 15, 1936.  A. B. WINCHELL  2,064,777
PHONOGRAPH
Filed April 26, 1930   16 Sheets-Sheet 8
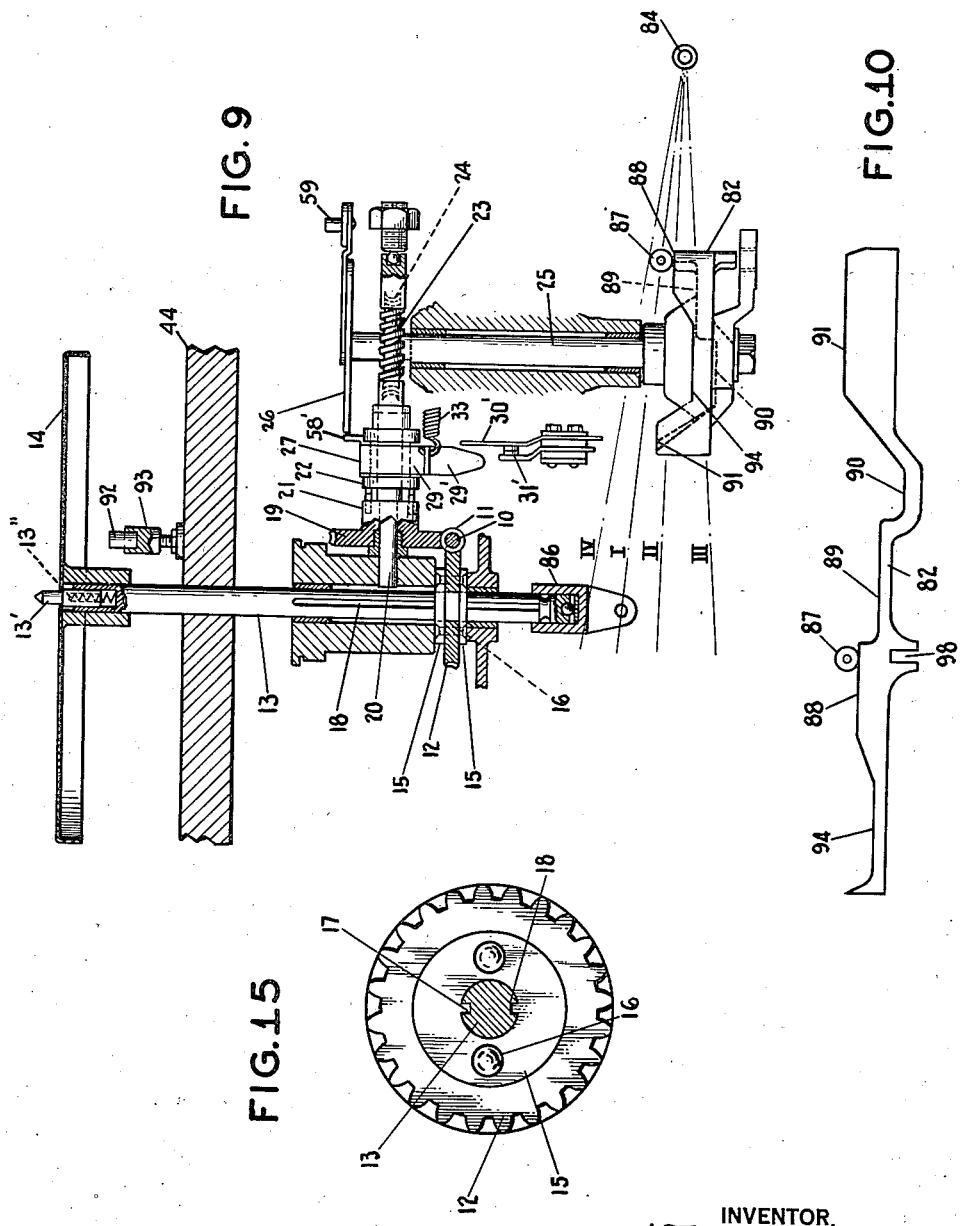

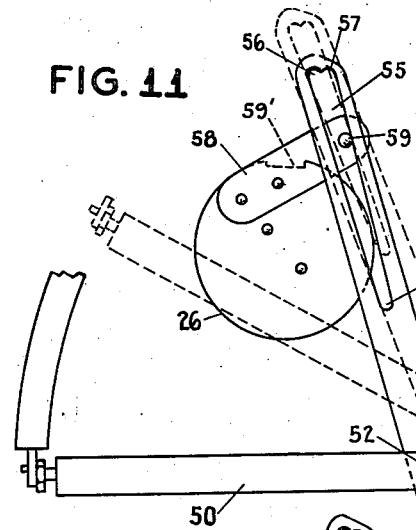
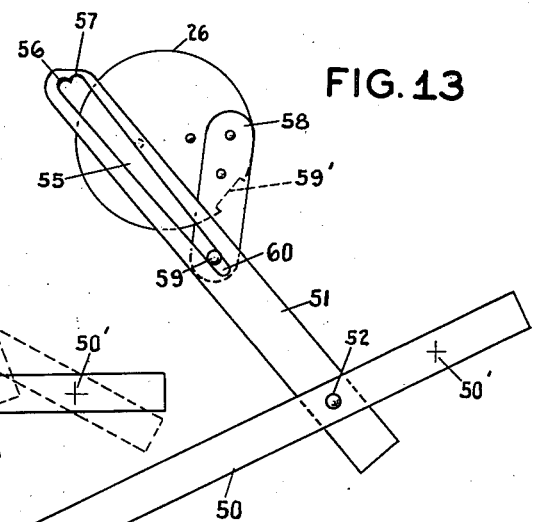
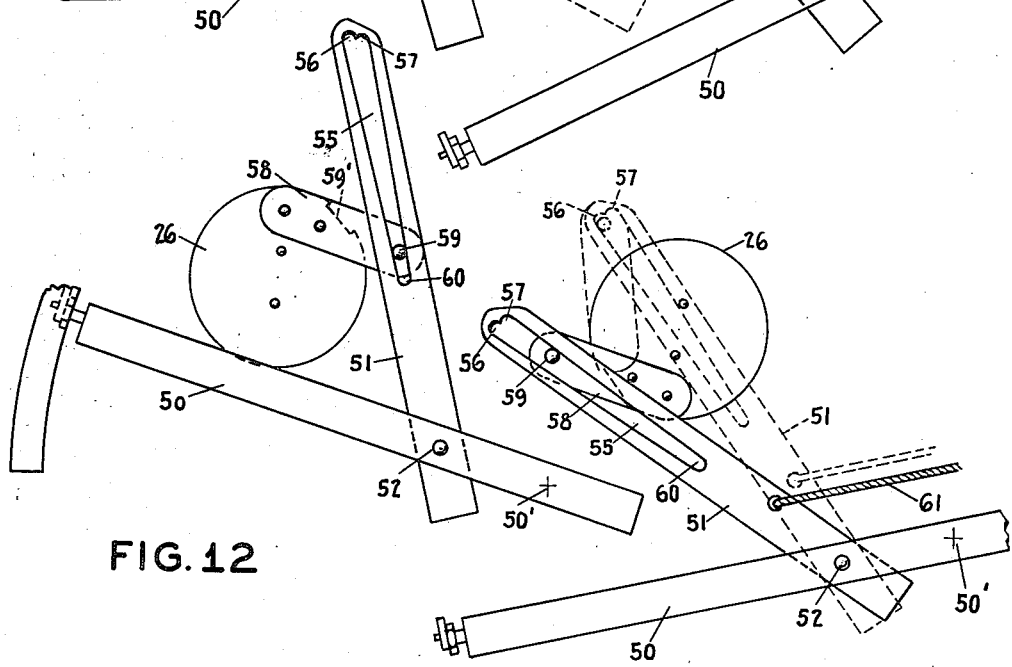

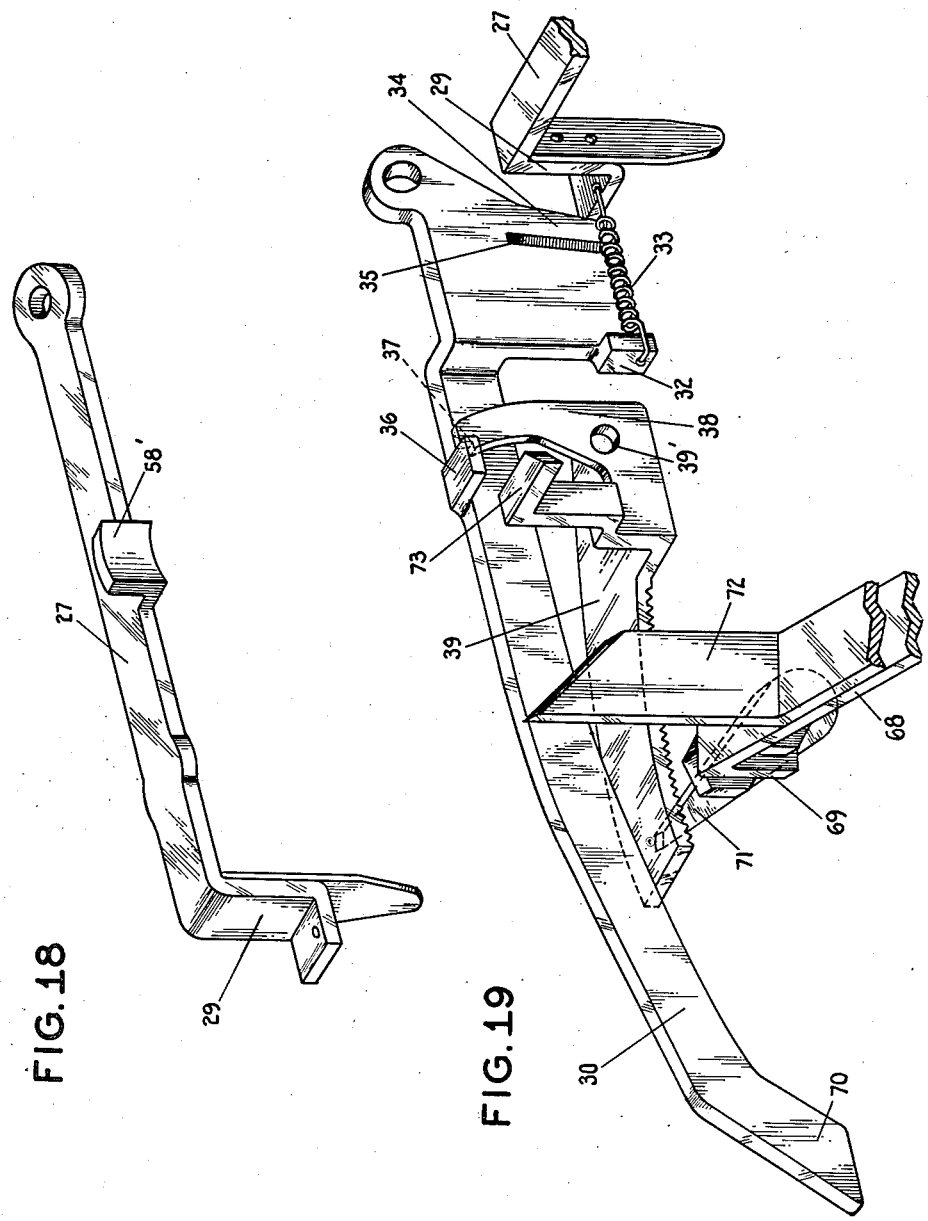

Dec. 15, 1936.  A. B. WINCHELL  2,064,777
PHONOGRAPH
Filed April 26, 1930  16 Sheets-Sheet 11

INVENTOR
ARTHUR B. WINCHELL
BY
ATTORNEY

Dec. 15, 1936. A. B. WINCHELL 2,064,777
PHONOGRAPH
Filed April 26, 1930  16 Sheets-Sheet 12

INVENTOR.
ARTHUR B. WINCHELL
BY
ATTORNEY

Dec. 15, 1936.  A. B. WINCHELL  2,064,777
PHONOGRAPH
Filed April 26, 1930   16 Sheets-Sheet 13
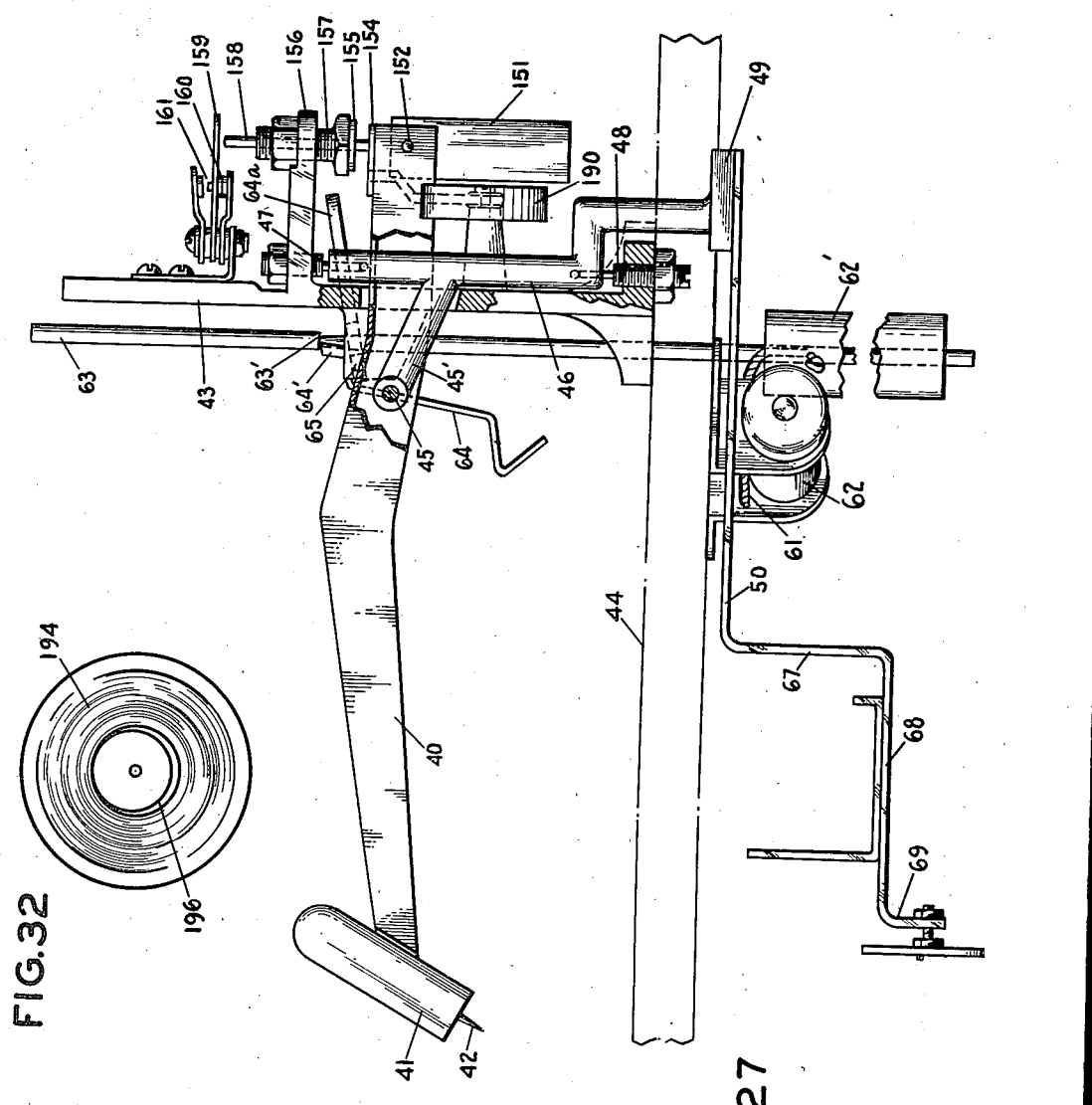
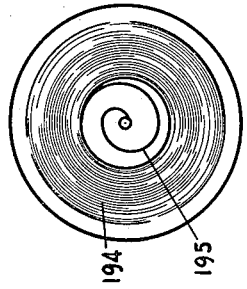
INVENTOR
ARTHUR B. WINCHELL
BY
ATTORNEY Dec. 15, 1936.     A. B. WINCHELL     2,064,777
PHONOGRAPH
Filed April 26, 1930     16 Sheets-Sheet 15

INVENTOR
ARTHUR B. WINCHELL
BY
ATTORNEY

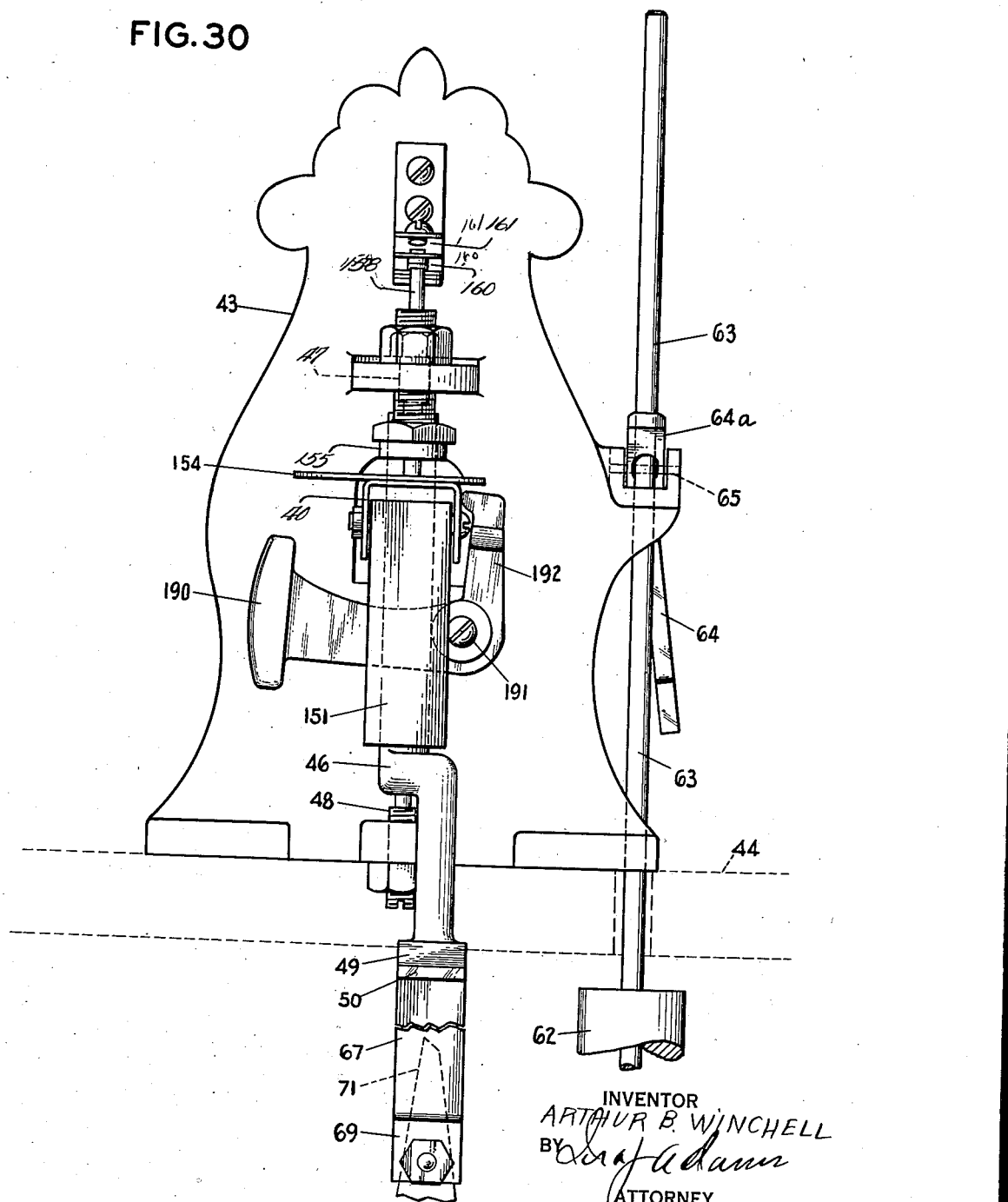

Patented Dec. 15, 1936

2,064,777

UNITED STATES PATENT OFFICE 2,064,777

PHONOGRAPH

Arthur B. Winchell, Jackson, Mich.

Application April 26, 1930, Serial No. 447,480

63 Claims. (Cl. 274—10)

This case relates to phonographs and is more particularly applicable to reproduction of sound from the common type of grooved record.

An object of the invention is to produce a phonograph that will automatically change from a played record to an unplayed one when it has been set into operation.

Another object is to provide means operable at will to cause the apparatus to automatically reject a record at any time during the playing thereof and before the automatic change comes into play with the insertion on the turntable of the next record without waiting for complete playing of the ejected record.

Another object of the invention is to provide means operable at will to cause the apparatus to automatically repeat the playing of the record on the turntable until it is stopped by the operator.

Another object of the invention is to provide record changing means where the records may be dropped into the hopper without taking care to see that the records are in line with each other or otherwise arranged in a predetermined manner.

Another object of the invention is to provide for the raising and lowering of the turntable to bring about the ejection of the record, the swinging of the pick-up arm and the reception of a new record.

A further object of the invention is to provide means for automatic stopping of the motor when the pick-up arm returns to playing position without there being a record on the turntable.

Another object of the invention is to provide starting means for the motor that will temporarily increase the starting torque with shifting of the torque back to its normal value when the mechanism has gotten under way.

Another object of the invention is to still further increase the starting torque on operation of the starting button if the motor happens to start with the record changing apparatus in gear and with a lesser value of torque if the motor happens to start with the record changing apparatus out of gear.

Another object is to use stored up energy of the motor to operate the motor switch and clutch, which operation is brought about by movement of the phonograph needle.

Other objects will appear in the following description, reference being had to the drawings in which:

Fig. 2 is a side view of the apparatus shown in Fig. 1 viewed in the direction of arrow a.

Fig. 3 is a side view of the apparatus shown in Fig. 1 viewed in the direction of the arrow b.

Fig. 4 is a plan view of the hopper and hopper slide showing the slide compensating mechanism for large size records.

Fig. 5 is a section of Fig. 4 taken on the lines A—A viewed in the direction of arrow c.

Fig. 6 is a section taken on the lines A—A of Fig. 4 viewed in the direction of arrow d.

Fig. 9 is a more or less diagrammatic view of the turntable and cam mechanism for shifting the turntable into the various positions.

Fig. 10 is a development of the cam shown in Fig. 9.

Fig. 11 is a diagrammatic sketch of the position of the pick-up arm and operating mechanism at the time that the record starts to play or in the position that the phonograph stops if no record has been placed on the turntable by the hopper slide.

Fig. 12 is a diagrammatic view of the pick-up lever mechanism of Fig. 11 after the record has been played and the discard operation has commenced.

Fig. 13 is a diagrammatic sketch of the mechanism of Fig. 11 with the pick-up arm in full swing-back position and with the throw-back arm starting on its return.

Fig. 14 is a view of the levers of Fig. 11 in full lines showing the return of the pick-up lever for a 10 inch record, and in dotted lines the return for a 12 inch record.

Fig. 15 is a plan view of the spline plates of the worm gear for driving the turntable.

Fig. 16 is a plan view of the driving arm that moves the hopper slide.

Fig. 17 is an elevation of the driving arm.

Fig. 18 is an elevation of the clutch lever.

Fig. 19 is an elevation of the throw-out lever.

Fig. 27 is an elevation of the pick-up arm.

Fig. 30 is an end view of the pick-up arm shown in Fig. 28.

Fig. 31 is a plan of a record having a spiral discard groove.

Fig. 32 is a plan of a record having eccentric discard grooves.

Figure 1:
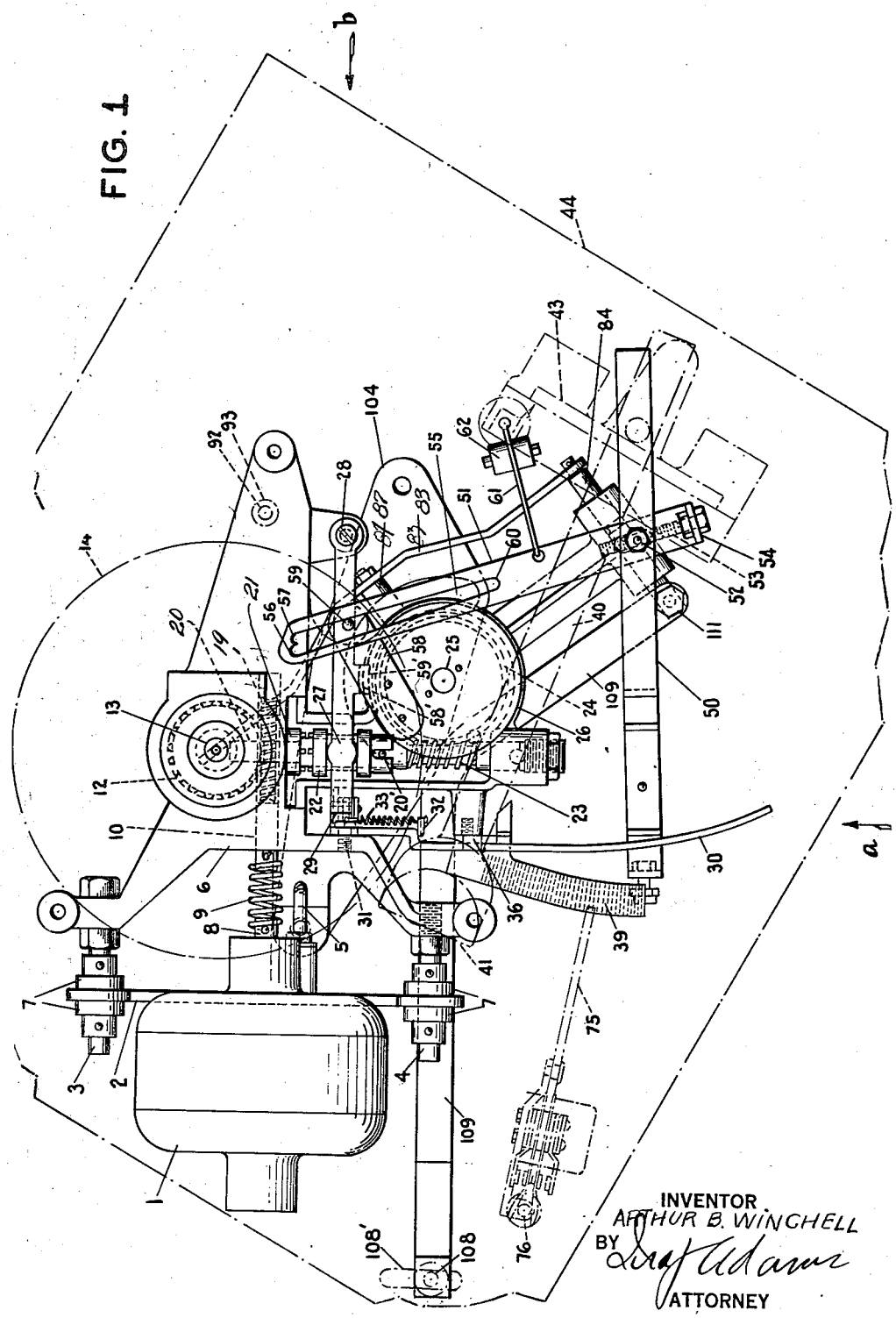
Fig. 1 is a plan view of the phonograph motor and the record changing unit.

The detailed construction of the apparatus will now be described. The phonograph may be operated by any type of motor but I have shown an electric motor 1 (Fig. 1) of the squirrel cage induction type. This motor is supported by means of a bracket 2 on studs 3, 4 and 5 secured in the arm of casting 6. Rubber bushings 7 act as cushioning means to prevent the vibrations of the motor being transmitted to the supporting bracket.

The motor armature shaft 8 is flexibly connected by spring 9 with the worm shaft 10 having worm 11 (Fig. 9) which meshes with worm gear 12 on shaft 13. The worm gear 12 itself slidably fits shaft 13 secured to turntable 14 but this gear has drive disks 15 (Fig. 15) secured to it on each side by means of screws 16 which disks have splines 17 fitting into keyway 18 in the shaft. This permits the shaft to be raised and lowered into various positions while being positively rotated by means of the gear 12.

The worm 11 on the drive shaft 10 also meshes with worm wheel 19 rotatably journalled on shaft 20. This gear 19 has a clutch member 21 having teeth adapted to engage with similar teeth on clutch member 22 slidably and non-rotatably secured to shaft 20 by a pin and slot arrangement 20' shown clearly in Fig. 1.

The shaft 13 has a pin 13' slidably arranged therein and spring 13'' urges the pin upward in Fig. 9. This permits the pin to yield if the record should improperly engage it in the changing of records.

The shaft 20 has a worm 23 meshing with worm gear 24, shown in dotted lines in Fig. 9 secured to vertical key shaft 25 keyed or otherwise secured to index disk 26. From the foregoing it will be seen that the electric motor 1 rotates the turntable shaft 13 whenever the armature rotates and that it rotates the index disk 26 only when the clutch 21, 22 is in position.

The clutch 21, 22 is thrown into and out of engagement by clutch lever 27 pivoted to the main casting at 28 and fitting in between the flanges on clutch member 22. This clutch member has a depending portion 29 fastened to a lug 32 of throw-out lever 30 by means of a spring 33. The clutch lever 27 is thus pulled to the inoperative position by throw-out lever 30 through this spring 33, but the clutch lever is thrown into the operative position by projection 34 (Fig. 19) on the lever 30 when that lever turns about its pivot. For ease of initial adjustment at the factory the member 34 may be formed by cutting slot 35 so that the actuating member can be bent towards or from the lever when the apparatus is assembled at the factory to secure the correct position of the lever. When the clutch lever is in the "off" position projection 29' on lever 27 engages switch arm 30' and opens switch arm 31' (Fig. 9).

Throw-out lever 30 has a projection 36 adapted, in the playing position of the record, to rest in notch 37, in projection 38 extending at right angles to trip lever 39 pivoted in the main casting at 39'. So long as projection 36 rests in notch 37 the spring 33 tends to maintain the clutch lever 27 in position to hold the clutch 21 and 22 in the off position.

The pick-up arm 40 (Fig. 27) (called tone arm in connection with mechanical phonographs) contains any suitable form of electrical pick-up 41 having needle 42 for fitting into the sound grooves of the record, and is pivoted at 45 to projection 45' of post member 46 which itself is pivoted at 47 and 48 in bracket 43 secured to platform or panel board 44 to which also the main casting already referred to is secured. The pick-up arm post 46 has a foot 49 secured to pick-up lever arm 50 (Figs. 1 and 27). The connection between the arm 40 and lever 50 is rigid so that they must move together as the post 46 swings about the pivot bearings 47 and 48.

The index lever 51 is pivoted at 52 to the pick-up lever 50. The pivot point 52 is adjustable in lever 51 by means of adjusting stud 53 secured to the down turned end 54 of the index lever 51 and threaded into pivot 52. This adjustment need only be made at the factory when the machine is assembled, and the lock nut will hold the adjustment.

Index lever 51 (Fig. 1) is slotted at 55 in such a way that the slot terminates at notch 56 at the left side and at notch 57 at the right-hand side. On index disk 26 is fastened an arm 58 having stud 59 fitting into slot 55. As disk 26 rotates stud 59 will slide the lever 51 and rotate pick-up arm 50 about pivot point 50' only when it engages the end 60, or the notches 56 and 57 of the slot 55. At other times the rotation of the disk 26 will merely oscillate the arm 51 about the pivot point 52. In the unclutched position projection 58' on the clutch lever locks the disk 26 by fitting into notch 59' therein.

In order to provide for the proper positioning of the needle for playing either 10 inch or 12 inch records the stud 59 is arranged in slot 55 so that it will normally contact with notch 57 in the last quarter of its revolution and pull the pick-up arm back to position for correctly starting a 10 inch record. This is shown in full lines in Fig. 14.

To provide for correct positioning of the needle when a 12 inch record is placed on the turntable a flexible cable 61 has one end secured to lever 51 (Figs. 1, 2 and 14). This cable passes around pulley 62 fastened in suitable supports to the platform 44 and has its other end secured to a weight 62' secured to a vertically movable trip rod 63 positioned in the pick-up arm bracket 43. This rod 63 passes through a hole in trip lever 64 pivoted in the bracket at 65 and has a notch 63' engaging the catch 64' on trip lever 64 and when the rod 63 is in this position there is sufficient slack in cable 61 to permit the stud 59 to contact with the right-hand side of slot 55 and enter notch 57 as the disk 26 approaches the last part of its revolution (see full line position of Fig. 14). Counterweight 64a normally maintains the catch 64' against rod 63. A 10 inch record will not engage the trip 64 but a 12 inch record will as it is dropped into the turntable. This trips the lever 64 and pulls catch 64' out of notch 63'. Weight 62' drops and pulls rod 63 downwardly which puts tension on cable 61. This pulls lever 51 to the right in Fig. 14 and keeps the left-hand side of slot 55 against stud 59, thus forcing it to enter notch 56. Notch 56 is further away from pivot 52 than is notch 57 and consequently the arm 50 and pickup arm 40 are pulled inward toward the record a less amount. This compensation is just enough to locate the needle at the beginning of the 12 inch sound grooves.

Lever 50 is bent downwardly (see Figs. 2 and 27) at 67 and thence horizontally at 68 and is further bent downwardly at 69. The end 70 of throw-out lever 30 (Fig. 19) will ride up horizontal portion 68 near the depending portion 69 when the lever 50 has been swung back to the extreme position shown in Fig. 13. At other positions of the pick-up lever 50 the horizontal portion 68 above referred to will lie inside the end 70 of throw-out lever 30.

On the depending end 69 of pick-up lever 50 is adjustably pivoted trip dog 71 (Figs. 1, 2 and 19). This dog is arranged to operate the trip lever in a way later to be described, whenever the needle enters the reject groove at the end of the record (Figs. 31 and 32). When the type of record shown in Fig. 31 is on the turntable the trip lever is tripped by the projection 72 secured to the horizontal portion 68 of the lever 50. This is brought about by the member 72 engaging with the bent over lug 73 (Fig. 19) on the trip lever 39. The manner in which these tripping actions takes place will be described in detail later.

Figure 20:
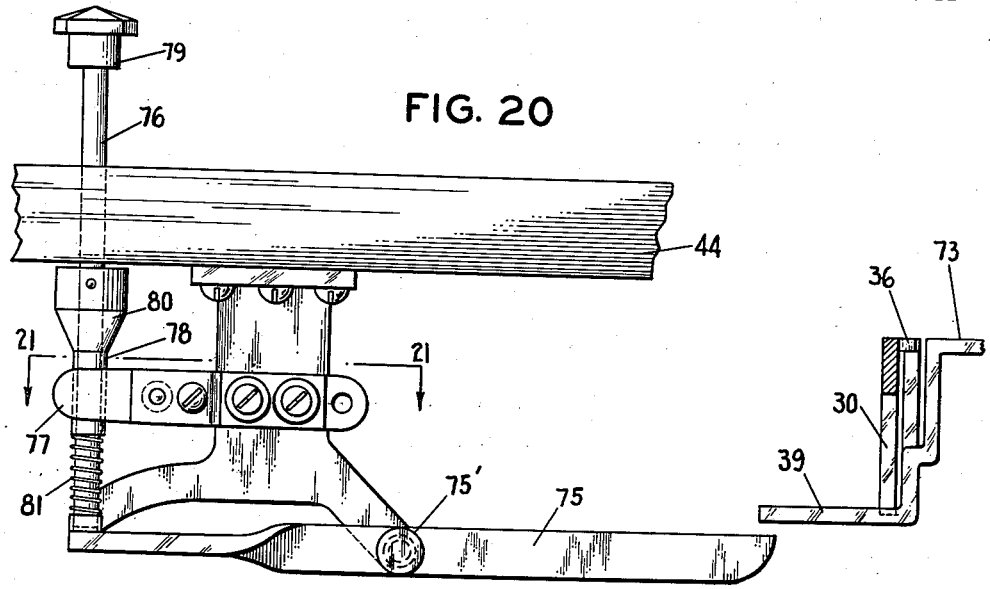
Fig. 20 is an elevation of the starting switch.
Figure 21:
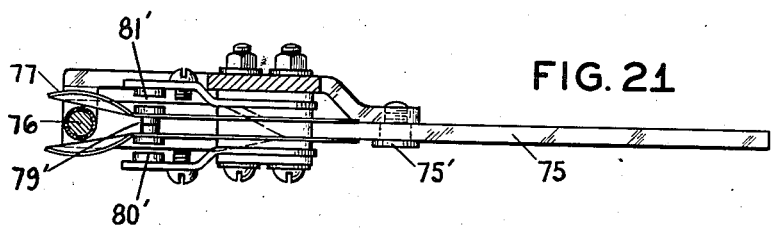
Fig. 21 is a plan view of the starting switch.

In addition to providing for the tripping of the lever 39 by the grooves at the end of the record, provision is also made for tripping this lever manually whenever the user desires to discard the record. Such means is shown in Figs. 1 and 20 and consists of a lever arm 75 pivoted at 75'. One end of the lever arm 75 extends beneath the trip lever 39 and the other end is adapted to be engaged by starting plunger 76 passing through the platform or panel board 44. Strips 77 constituting this switch are operated by insulation cone 80 on tube 78 secured to plunger 76. Pushing down on button 79 raises trip lever 39 and releases the catch engagement 36, 37, permitting the lever 30 to drop and bring about the closing of the clutch and permits switch 31' to close the motor circuit through the resistance 174 and through the motor coils in series. By pushing further down on button 79 the motor coils will be placed in parallel by opening of switch 79' and closing switches 80' and 81'. That is, a light pressure will only trip the lever 39, but heavier pressure will trip the lever, open switch 79' and close switches 80' and 81'. By pushing lightly on button 79 the motor will start with the motor coils in series. By using heavier pressure on the button the motor will start with the coils in parallel. The purpose of this will be referred to later. When pressure on button 79 is released spring 81 brings the plunger and connected parts back to normal position shown in Fig. 21, thus closing switch 79' and opening switches 80' and 81'. This puts the motor in normal running condition with the coils in series.

At the lower end of shaft 25 (Figs. 2 and 9) is secured a cam 82 shown in development in Fig. 10. This cam brings about the raising and lowering of the turntable when records are being changed or repeated. For this purpose lift lever 83 is pivoted at one end in repeat plunger 84 secured in extension 85 of the casting. The other end of this lever 83 is pivoted in thrust bearing 86 in which rests turntable shaft 13. Lift lever 83 has roller 87 pivoted between its ends and resting upon the cam surfaces 88, 89, 90 or 91 (Figs. 9 and 10). The lever and other parts are omitted in Fig. 9 in order to show additional parts of the apparatus. The roller 87, however, is shown in Fig. 9. When roller 87 engages cam surface 88 the turntable is supported at position I, which is the playing position. When the cam rotates counter-clockwise, as viewed from the bottom of Fig. 9, roller 87 descends to surface 89 and brings the turntable to position II. In this position the turntable has been lowered below the needle of the pick-up arm so that the latter can be swung to the swing back position.

As the cam continues to rotate roller 87 descends to the lowest cam surface 90. This brings the turntable to position III in which position the record on the turntable has been brought into engagement with the rubber 92 of the discard post 93 and the record is discarded in the way to be described later. As the cam continues to rotate roller 87 is raised to the highest surface 91 and the turntable is raised to position IV which is the position for receiving a record from the hopper slide referred to later. As the cam further rotates roller 87 descends to surface 94 which is at the same elevation as surface 89. In this position the pick-up and needle is swung back into position over, but out of contact with, the new record that is now resting on the turntable. As the cam completes one revolution roller 87 is raised to surface 88 and the turntable is brought back to position I. As it is brought back to this position the record engages the needle in the pick-up arm and the playing of the record commences. This movement also closes switch 160 and opens switch 161 on the pick-up arm (Fig. 27). Soon thereafter projection 58' snaps into notch 59', the clutch is disengaged and the clutch switch is opened by projection 29' engaging spring arm 30' (Fig. 9).

The cam 82 thus makes one complete revolution during each change of the record or during the repeating operation. When the cam has made one complete revolution clutch members 21 and 22 are disengaged and further rotation stops, which will be more clearly understood when the operation of the apparatus is described in detail.

Figure 22:
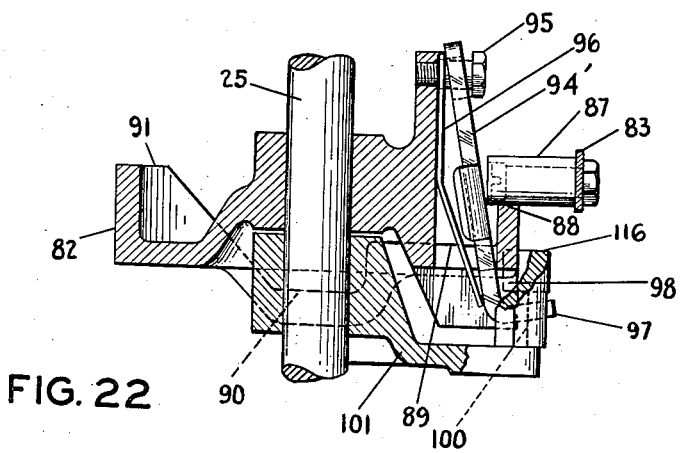
Fig. 22 is a section of the cam and driving arm.
Figure 25:
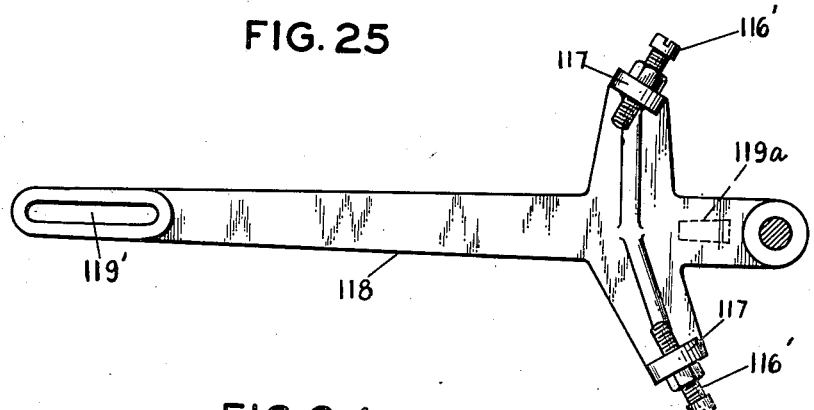
Fig. 25 is a plan of the top lever.
Figure 24:
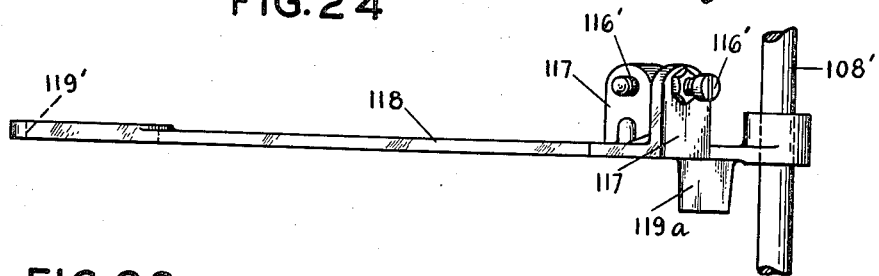
Fig. 24 is an elevation of the top lever.

Referring to Figs. 2, 3 and 22, cam 82 has a repeat dog 94' fastened to it by screw 95 with spring 96 arranged to urge the dog to the left in Fig. 22. At the lower end of the dog 94' is a projection 97 bent at substantially right angles to the main body of the dog which extends through the slot 98 in the cam and into position to engage the surface 100 of drive arm 101 illustrated in Figs. 17 and 22. This arm is secured to shaft 25 so that such shaft freely rotates in its central hole 102 unless projection 97 on the dog 94' engages surface 100. When this engagement takes place the arm 101 is forced to rotate with the cam.

Figure 23:
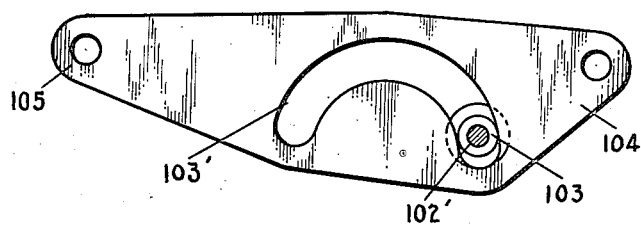
Fig. 23 is a plan of the driving lever.
Figure 26:
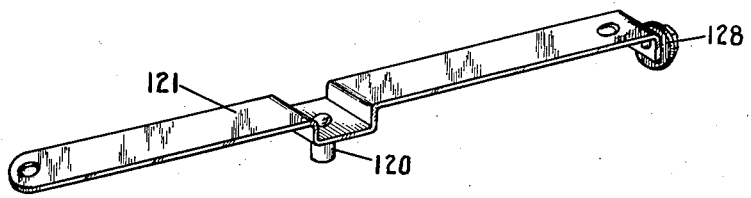
Fig. 26 is an elevation of the transverse lever.

Driving arm 101 has a stud 102' passing through a roller 103 in arcuate slot 103' in driving arm 104 shown in plan in Fig. 23. This driving arm has its end 105 pivoted by stud 106 to projection 107 of the casting. The slot 103' is generated from a circle having its center in the center of the shaft 25 when the slide is at rest and the record is in playing position. When the arm 101 first starts to rotate it engages one side of the slot and moves the arm 104 out during somewhat less than a quarter of a revolution of the shaft. The next quarter, or somewhat less than a quarter, of a revolution, of arm 101 moves the arm 104 in the reverse direction and during substantially the last half of the revolution the shaft 25 is located at the center of the arc and the roller moves along the arc without moving arm 104. These series of operations permit the slide to move the record over the turn table and to return to idle position before the turntable completes the last half of its cycle.

Repeat button stud 108 (Fig. 2) is arranged in slot 108'' in the panel board or platform 44. This repeat button stud is secured to shift lever 109 pivoted in the main casting at 110. This lever is bent in irregular shape as indicated in Fig. 2. The lower end of the shift lever is pivoted at 111 in plunger 84. When the listener intends to have the phonograph play the records in order, the repeat button is left in the position in Fig. 1 which holds the lift lever 83 and roller 87 in the position shown in Fig. 22. In this position the roller 87 is kept out of contact with dog 94' and the projection 97 engages the wall 100 of the driving arm 101 (Fig. 17). When the record has been completed, therefore, the rotation of the cam 82 will carry along with it the driving arm 101 which operates the driving lever 104 and brings about the movement of the hopper slide for depositing the record on the turntable, as will be referred to in describing the operation of the phonograph.

When the listener desires to have a record repeated, repeat button 108 will be pushed so as to move the repeat plunger 84 to the left in Figs. 1, 2 and 3. In doing this snap ball 112 urged upward by spring 113 will be forced out of groove 114 in the plunger 84 and as this plunger is moved to the left the ball will snap into groove 115. These grooves 114 and 115 hold the plunger in the adjusted position.

The movement of the repeat plunger 84 pulls arm 83 (Fig. 22) to the left, forces the roller 87 into engagement with dog 94' and moves it against the tension of spring 96 to the left until projection 97 on the dog clears wall 100 of the driving arm 101. As the cam 82 rotates, the driving arm 101 will remain stationary because it is no longer connected thereto by the dog 94'. Therefore, the driving arm 104 and the hopper slide will not be operated to place a record on the turntable. As the cam 82 rotates in the way previously described roller 87 can descend no lower than the swing-back position 11 of Fig. 9 because the driving arm 101 is now stationary and the roller rests on the arcuate surface 116 of the driving arm (Fig. 16). This prevents the lift lever 83 from lowering the record into contact with the rubber 92 of the discard post 93. All operations will therefore be repeated except that the record will not be discarded and a new record will not be placed on the turntable. The cam 82, the pickup arm and the pickup arm lever will go through the movement previously described and when the playing again starts it will be from the same record instead of from a new one.

Driving arm 104 (Figs. 7 and 8) is secured by stud 105' to one end of link 106', the other end of which is connected to arm 107' pinned to vertical shaft 108'. This shaft passes through bearing member 109' in cross bar 110', fastened to the cabinet (shown in fragments only) and the other end is journalled at 111' in arm 112' forming an integral part of the hopper casting 113'. A collar 114' is clamped on the shaft 108' by a set screw so as to rest on the bearing 109' and thus hold the shaft from downward movement. This bearing has a bushing 109'' of spherical shape to constitute a universal bearing. This prevents binding in the bearing if the shaft is somewhat out of line. The shaft is prevented from moving upward in Fig. 8 by means of yoke 119 on the upper end of the shaft which engages the top lever 118 which in turn bears against the side of the bearing 111' in the arm 112' of the hopper casting 113'. This arm has two bosses 115' and 115'' located between two adjusting studs (Fig. 29) 116' threaded through two projections 117 integrally joined to the top lever 118 which is loosely positioned on the shaft 108'. The adjusting screws 116' are limiting devices to locate the extreme movements of the slide 123 in the forward and backward position by contacting with boss 115' or 115''. If it were not for these screws there might be enough play in the driving arm and link mechanism to cause the slide to overrun slightly particularly in locating the record over the turntable.

The yoke 119 is keyed to shaft 108' and has set screws 117a in its forks 118a which engage the lug 119a on the bottom of the top lever 118. This permits adjustment between the shaft and the top lever.

Lever 118 has a slot 119' in its outer end adapted to receive pin 120 threaded into the intermediate portion of transverse lever (Figs. 4 and 7) 121 pivoted at 122 to hopper slide 123 which is adapted to receive an assortment of phonograph records. The other end of lever 121 is pivoted to one end of regulating or compensating link 124. The other end of link 124 has a slot 125 leading at its outer end into a depression 126. Stud 127 passes through the slot or the depression, as the case may be, and is threaded into the slide 123. The link 124 positions arm 121 in respect to slide 123 in two different places. When the stud is at the right-hand end of slot 125, as shown in Fig. 4, arm 121 takes the position designated by X in that figure. When the stud rests on the opposite end of the slot 125 the lever 121 will take the position designated Y in Fig. 4. A roller 128 on the arm 121 permits this movement in respect to the slide 123 with a minimum amount of friction.

Figure 8:
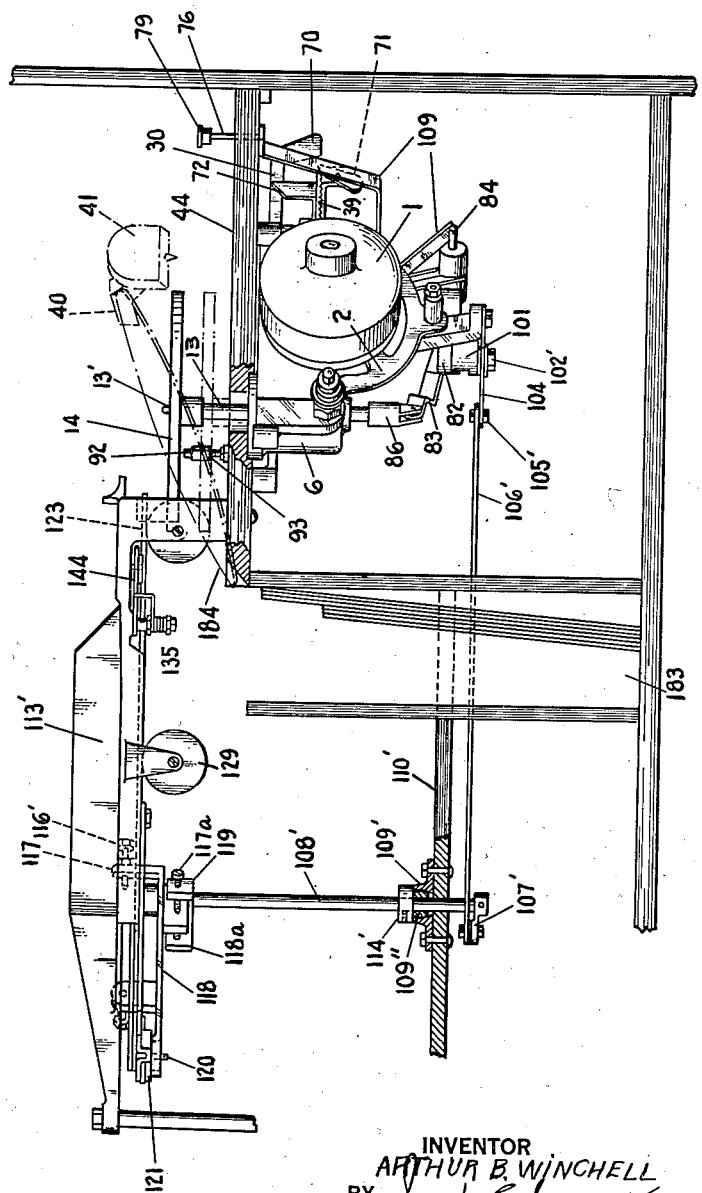
Fig. 8 is a side view of the assembled apparatus.

The slide 123 moves in hopper casting 113' and rests on four rollers 129 journalled in the hopper casting (Figs. 4 and 8).

The slide 123 has fastened to it two back plates 130 substantially the thickness of a single record and are adapted to engage the rear circumference of the bottom record to push it to the right under movement of the slide.

To insure that the bottom record is properly centered against the rear centering wedges 130 a back center lever 131 and a front center lever 132 are pivoted in the hopper casting 113' at pivots 133 and 134 respectively. Lever 131 is urged clockwise (Fig. 5) by spring 135 coiled around pivot 133, one end of the spring resting against the forward end of the lever and the other one being secured in the flange 136 of a bushing fitting inside the coil and resting against flange 137 of the pivot stud. By turning flange 136 tension may be placed on this spring which tension may be held by screwing down nut 138 to hold the bushing tightly against the hexagonal flange 137. A lock washer 139 may be used to hold the adjustment.

The left-hand end of lever 131 is forced by the spring against stub pin 140 but the lever can be rotated counter-clockwise by the records in a way to be explained later.

Centering lever 132 is pivoted to the hopper casting 113' by means of a similar bolt, stud and spring arrangement generally indicated by 141. However, in this case the spring is wound in a left-hand direction so as to urge the lever 132 in counter-clockwise direction and against stop pin 142. The lever can be rotated clockwise against the tension of the spring by records on the slide when the slide is moved toward the turntable.

The location of stop pins 142 and 140 is such that the ends 143 and 144 of the centering levers will just clear the bottom record of small size, for example, a 10 inch record when it is properly centered on the slide against the back plates or centering wedges 130. As the slide moves to the right in Fig. 4 the centering levers 131 and 132 will push the small size bottom record into center position if it happens to be located at one side or the other. When a large size, for example, a 12 inch record is at the bottom on slide 123 it will engage the ends 144 and 143 of the centering levers 131 and 132 as the slide is moved to the right in Fig. 4 and the record will be centered by seating it against the centering wedges 130. As soon as the large size record is centered against the wedges 130 it can yield no further and continued movement of slide 123 forces levers 131 and 132 to rotate in counter-clockwise and clockwise direction respectively (Fig. 4) against the tension of the coil springs. The purpose of this movement will be referred to in the description of the operation of the phonograph.

Figure 28:
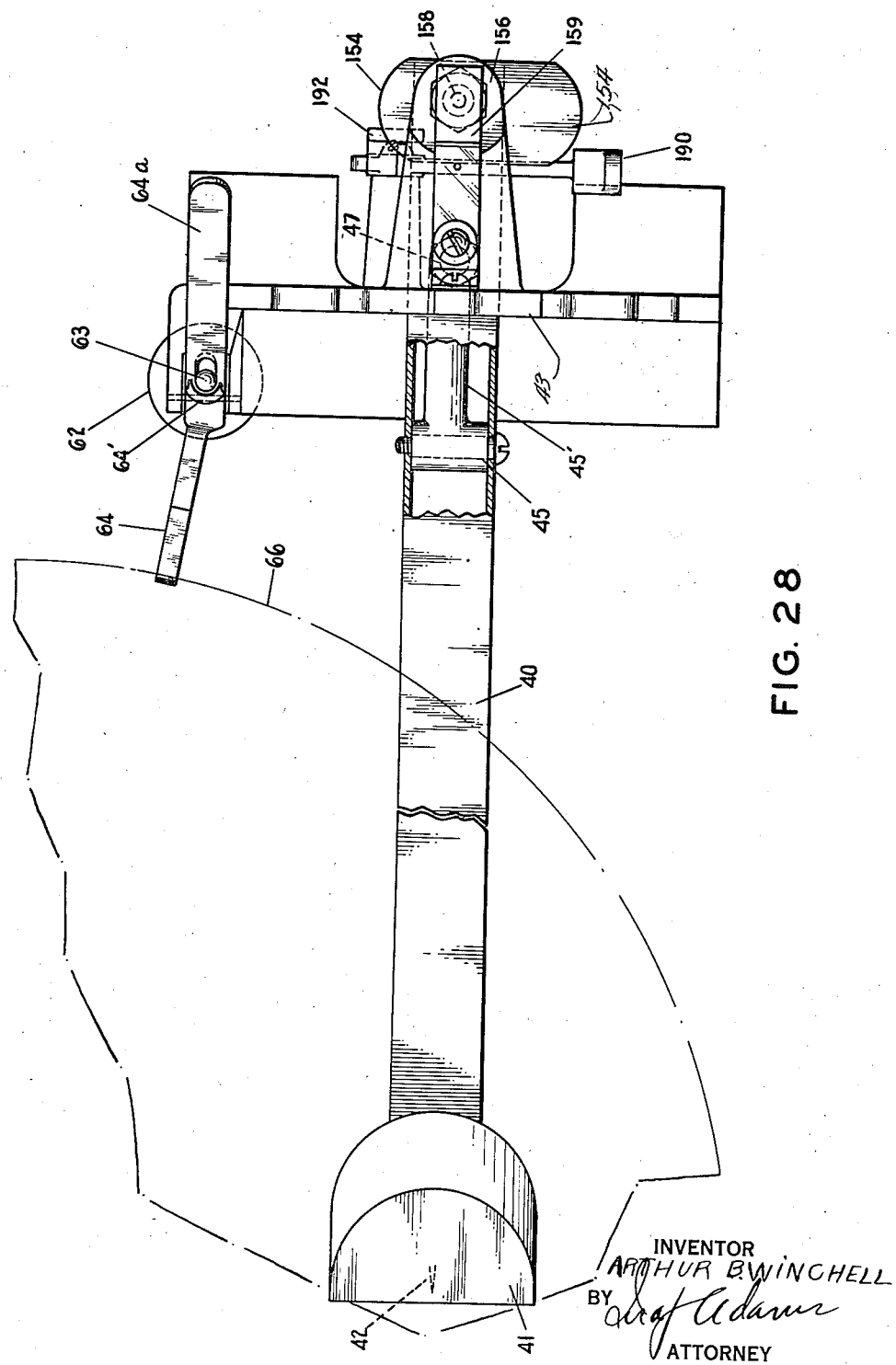
Fig. 28 is a plan of the pick-up arm.

In Figs. 27 and 28 the details of the pick-up arm are shown. Pick-up arm 40 consists of a channel shape bar (see Fig. 3) and extends through a central opening in bracket 43. The rear end of this arm has a counter weight 151 pivoted to it at 152 but it is not sufficient to counter-balance the arm. Pivot 45 permits vertical movement of the pick-up arm. Horizontal movement of the pick-up arm takes place about the pivotal points 47 and 48 already referred to.

On top of the rear end of pick-up arm 40 is arranged a brake shoe 154 adapted to contact, when the needle has been lowered below the level of the record, with another brake shoe 155 adjustably secured to the rear shelf 156 integrally secured to the bracket 43. When the turntable is lowered as previously referred to, the pick-up 41 will descend until the two brake shoes are brought into contact and further movement is then prevented. As the pick-up arm is swung backward or forward in the record changing operation of the mechanism the braking surfaces will prevent over-running of the arm and connected levers and thus hold them in the desired positions.

The adjusting stud 157 of the pick-up brake has a central hole through which passes a switch pin 158 adapted to rest on the braking surface 154 and to be moved upward against switch arm 159, when the pick-up 41 descends by the lowering of the turntable and record. This movement of the pick-up forces pin 159 to raise switch arm 159 and brake switch contacts 160 and make switch contacts 161. The purpose of these contacts will be referred to in a description of the operation of the machine.

The general construction of the phonograph having been disclosed, its operation will now be described. The user of the phonograph will place a plurality of records either small size, large size, or any promiscuous arrangement of the two, in the hopper on top of slide 123. The walls 150 surrounding the sides and back portion of the hopper leave ample room for the records so that they may be carelessly placed in the hopper and no accuracy is required in positioning them.

Figure 33:
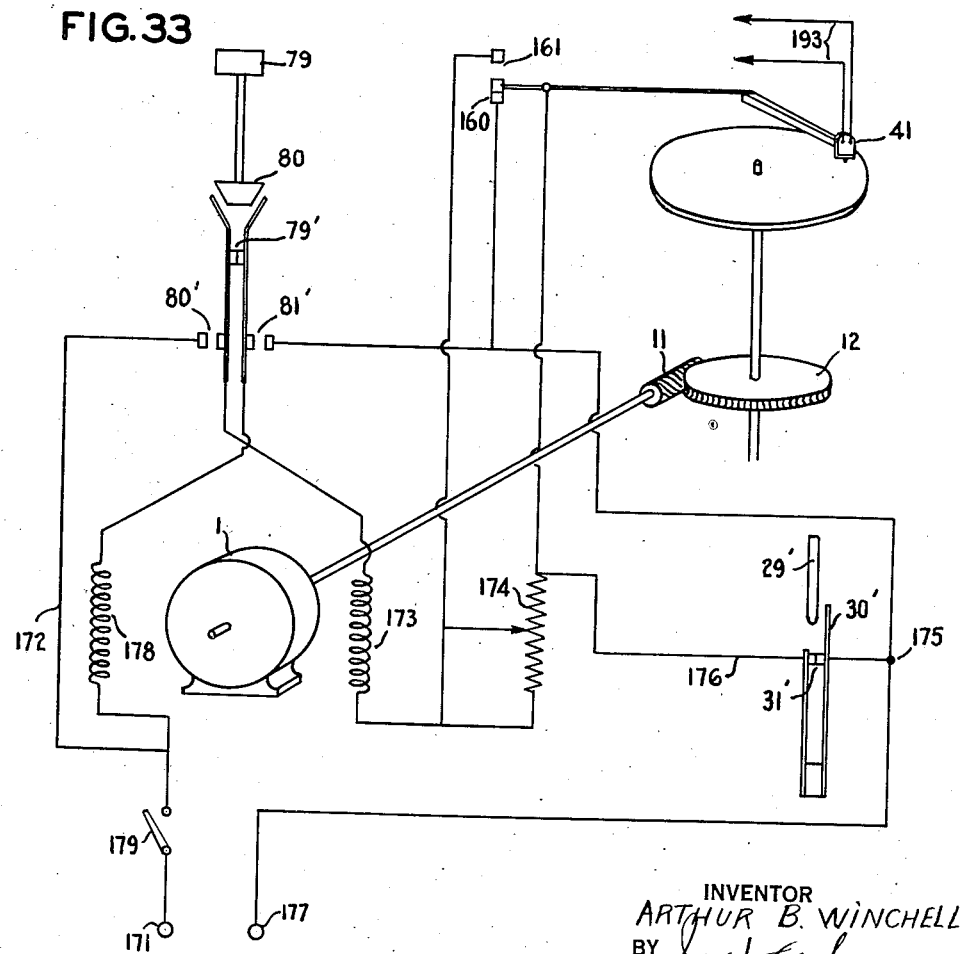
Fig. 33 is a diagram of the electrical circuit of the motor.

To start the instrument push button 79 (Figs. 1, 20 and 33) will be depressed. This downward thrust will tilt lever 75 and raise it against the trip lever 39. The raising of the lever 39 removes the notch 37 from under the projection 36. As soon as this takes place lever 30 drops downward due to its own weight. This movement forces the abutment 34 on the rear end of this lever against the downwardly extending end 29 of the clutch lever 27 and forces the clutch members 21, 22 together. The motor now starts as its circuit is closed. The circuit may be traced from alternating current main 171, master switch 179, motor coil 178, switch contact 79', motor coil 173, resistance 174 in the speed control, line 176, clutch switch contacts 31', friction point 175 and back to main 177. This starts the motor with the motor coils in series.

If in previous use of the phonograph the operation was stopped by opening the master switch 179 while the record was being changed maximum load would be on the motor as soon as the master switch was again closed. If the load was such as to stall the motor the operator would push down on button 79 until contacts 79' are opened and contacts 80' and 81' are closed. This would give the motor more torque and enable it to start with the maximum load upon it. The circuit in this case may be traced from alternating current main 171 through switch 179 and wire 172, switch 80', motor coil 173, switch 161 on the pick-up arm (Figs. 27 and 33) wire 176, switch 31', to junction point 175. At the same time current passed through the other motor coil 178, switch 81' to the same junction point 175 and thence to main 177.

The circuit thus traced places the potential of the mains on the two motor coils in parallel, with the resistance 174 short-circuited. This produces a strong field and gives the motor a heavy starting torque to take the full load imposed under the condition mentioned. Under either of the above conditions the motor is started and through clutch 21 and 22 rotates worm 23 and the index disk 26. It also rotates through the same worm, worm gear 12 and turntable 14. The rotation of disk 26 is permitted at this time because the closing of the clutch 21, 22, removed catch 58' (Figs. 1 and 10) from notch 59' in the disk. Index disk 26, shaft 25 and cam 82 (Fig. 9) commence to rotate under power of the motor. For a considerable portion of this initial rotation of disk 26 the stud 59 slides in groove 55 of link 51 producing no movement of the latter, except to rotate it about its pivot point 52. Rotation of the cam 82, however, causes roller 87 (Figs. 9 and 10) to drop to swing-back surface 89 of the cam, lowering the turntable to position II. This lowers the turntable and the record thereon beneath, and away from, the needle of the pick-up arm, thus freeing the needle from the record so that it can be swung back.

As soon as the turntable and record were lowered the pick-up arm 40 dropped slightly and brought the brake surfaces 154 and 155 together (Figs. 27 and 30). At the same time it pushed upward on rod 158, opened switch 160 and closed switch 161. The closing of switch 161 short-circuited the remaining portion 174 of the speed regulating rheostat and increased the torque. There is no utility in this, however, if the motor started, as has been supposed, from playing position of the turntable, but if the master switch 179 had been opened by the user and the phonograph stopped while it was changing the records the switch 161 would be closed on operation of button 79, and this would give maximum torque to the motor for starting when all of the apparatus was geared to it and imposing a maximum load at the start.

Substantially at the same time the operator would have released pressure on button 79 and spring 81 would have forced it back into its original position, thus opening switches 80' and 81' and closing switch 79'. This puts the two coils in series, the circuit being traced from main 171, field 178, switch 79', field 173, switch 161, junction point 175 to main 177. This changing of parallel to series relation reduces the flux and correspondingly reduces the torque at a time when the motor is under headway and large torque is unnecessary.

Figure 29:
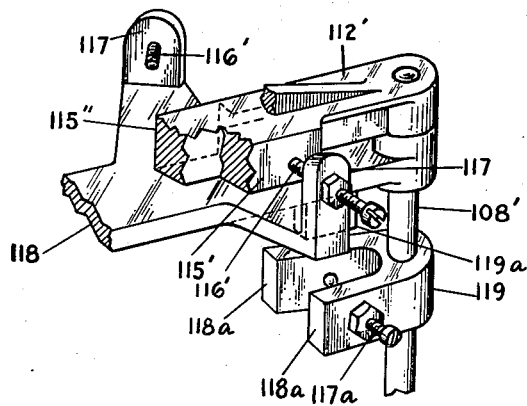
Fig. 29 is a perspective view of the yoke and a portion of the top lever with the parts drawn apart for better illustration.

As cam 83 rotates, the roller 87 passes to the right in Fig. 10 over cam surface 89, the cam moving to the left. Assuming that the repeat lever is in the position shown in Fig. 1, in which position repeating will not take place, lever 83 holds roller 87 out of contact with dog 94'. The projection 97 as the cam rotates carries along driving arm 101 by contact of this projection 97 with surface 100. The movement of arm 101, through stud 102', (Figs. 2 and 7) rotates arm 104 clockwise around its pivot 106. This latter movement through link 106' and arm 107' (Fig. 8) rotates shaft 108' and yoke 119. Through adjusting screws 117a this yoke engages the projection 119a beneath arm 118 (Fig. 29). This moves top lever arm 118 and transverse lever 121 connected thereto. At this time link 124 has its depression 126 engaging the stud 127 in the slide (Fig. 4). Lever 118 therefore is virtually pivoted to slide 123 at point 120 and the slide starts moving to the right. Up to the present time the starting of the motor and the closing of the motor clutch brought into rotation index disk 26, and lowered the turntable to the swing-back position II by means of the cam and lift lever 83, and started the slide moving to the right in Figs. 4 and 7 through the coupling of the driving arm 101 to the cam.

Continued rotation of cam 82 beneath roller 87 brings the roller to the lowest surface 90 (Fig. 10). This drops the roller and lift lever and the connected turntable to the discard position III. This lowering of the turntable brings the back edge (Figs. 3, 8 and 9) of the rotating record on the turntable into contact with rubber 92 of the discard stud 93, thus transferring the pivot point of the record from the receiving pin 13' to the rubber 92 in the discard stud.

The continued rotation of the turntable turns the record about the point 92 and thus rotates it off of the turntable and drops it into the discard hopper 183. Reference character 184 indicates in dotted lines the record as it is being slid into the hopper.

Figure 7:
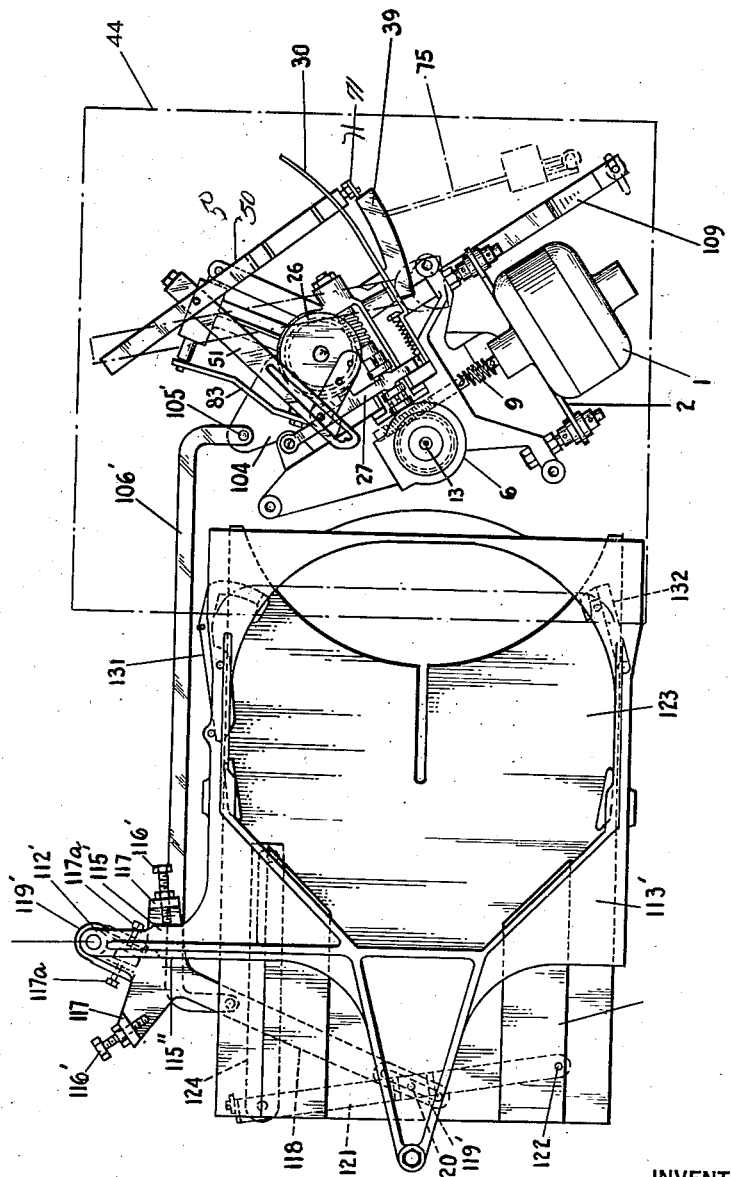
Fig. 7 is a plan view of the motor and record changing unit of Fig. 1 with the hopper and slide in assembled position.

At about the time the turntable is lowered to discard position III stud 59 reaches the end of its travel in slot 55 and further rotation pushes link 51 to the right in Fig. 7. This movement of the link 51 swings pick-up lever arm 50 and pick-up arm 40 about the pivot points 47 and 49. This does two things. First, it swings the pick-up away from the record so that the latter can be raised to receiving position, and second, the end of the horizontal portion 68 engages the slanting down turned end 70 of throw-out lever 30 and causes that slanting surface to ride up on the flat surface 68 until the throw-out lever is raised to its normal position at which time notch 37 of the catch 39 engages the abutment 36 (Fig. 19). This movement of the throw-out lever 30 to its normal position places tension on spring 33 tending to pull the clutch lever 27 to the unclutched position. However, the clutch cannot return to the unclutched position at this time because upturned projection 58' is resting on the circumference of disk 26 and cannot move under the urge of the spring 33.

During all this time the slide 123 is traveling with the record to the right in Figs. 4 and 7 to position the record over the turntable. The cam 82 continues to rotate under the driving force of the motor until the roller 87 rides up the slanting surface to surface 91 on the cam.

As the roller is pushed up this incline to the top surface, lift lever 83 raises the rotating shaft 13 and turntable 14 to the highest position IV. At this time the slide 123 has moved to the end of its travel to the right and as the turntable is brought into position IV the receiving pin 13' enters the center hole of the record. The turntable is held in this high position during all the time that the roller 87 on lift lever 83 is riding on surface 91 and during this time the movement of the roller on stud 102' along the arcuate return surface of slot 103 starts the slide on its return to the left. The slide will be withdrawn from under the record by the time the turntable is lowered by the roller descending to the swing-back surface 94 of the cam, thus bringing the turntable back to the swing-back position II with the record in place. During this time the rotation of disk 26 causes stud 59 to proceed first along the left-hand side of slot 55 and then along the right-hand side as the stud rotates through the last quarter of its revolution until it engages notch 57. Further rotation of disk 26 pulls inward on link 51 and swings pick-up arm lever 50 and the pick-up arm 40 back towards the turntable. During this swinging of the arm the throw-out lever 30 remains in latched position because it is held by engagement of notch 37 with abutment 36. As the cam and disk continue to rotate the pick-up arm is brought back to the normal playing position as is approximately shown in Figs. 1 and 2.

As the disk and cam continue to rotate stud 59 leaves detent 57 and travels down the right-hand surface of slot 55. During this time the rotation of the cam brings the surface 88 under roller 87 and raises the turntable back to playing position I. The bringing of the turntable up to the normal playing position engages the outer top surface of the record with the needle 42 of the pick-up. The pick-up arm is thus raised by engagement with the needle and switch operating rod 158 is lowered permitting the closing of switch 160 and opening of switch 161. The braking surfaces 154 and 155 separated at this time to permit free movement of the pick-up during the playing of the record.

The opening of switch 161 removes the short-circuit around the resistance 174 of the rheostat, and decreases the torque still further as the load is reduced. The closing of switch 160 establishes a sustaining circuit for the electric motor. Clutch switch 31' is opened shortly after switch 160 is closed by disk 26 rotating sufficiently to bring notch 59' opposite projection 58' on the clutch arm. As soon as this position is reached spring 33, placed under tension as previously described, snaps the clutch lever 27 down in Fig. 1 until projection 58' enters the notch 59'. This locks the disk and cam against further rotation and opens the clutch, disconnecting the motor from the record changing apparatus. It is preferable to so design the spring as to remove spring tension from the clutch at this time. The opening of clutch switch 31' is accomplished (Fig. 9) by engagement of projection 29' with switch arm 30'. The opening of clutch switch 31' does not stop the motor as it has the sustaining circuit through switch 160 on the pick-up arm. The record therefore continues to rotate with the needle on the edge thereof. While rotation of the record may pull the needle into the playing grooves in most cases, I prefer to use a weight 190 pivoted at 191 in the bracket 43 and having a projecting lever arm 192 engaging the rear side of the back end of the pick-up arm 40 in Fig. 27 to aid the arm in making its initial movement into the sound grooves. This weight is superior to a spring as it exerts constant force regardless of the position of the pick-up arm.

The motor is now unclutched from everything except the turntable. Disk 26, cam 82 and hopper slide 123 remain stationary. In this position the motor coils are in series and the rheostat is in circuit. The speed of the motor at this time may be adjusted by controlling the potential applied thereto through adjustment of the rheostat shown diagrammatically in Fig. 33. This adjustment when once made usually will be permanent though it may be adjusted by the user at any time.

The rotation of the record draws the needle around through the sound grooves and reproduces the sound through the electric pick-up 41 in ways well known in the art and since this forms no part of this invention, details of the pick-up and loud speaker are not illustrated, but it will be understood that the leads 193 from the pick-up will pass to vacuum tube amplifiers in the standard way.

As the needle travels around the sound groove the pick-up arm 40 is swung inwardly around the pivots 47 and 48 and at the end of the sound grooves the needle is brought into the discarding grooves at the center portion. At present there are two standard forms of grooves for rejecting records in automatic phonographs. One of these is shown in Fig. 31. Reference character 194 indicates the sound portion of the record. The end of the sound grooves lead into a spiral groove 195 which spiral brings about the discarding of the record. Figure 32 shows the other standard form which consists of a concentric circular groove 196 into which the end of the second sound groove leads.

If the record that has just been played contains the spiral discard groove 194 of Fig. 31 the pick-up arm and the attached lever 50 will be quickly moved inward in Fig. 1 until upstanding projection 72 of arm 50 engages projection 73 on the catch 39. As the pick-up arm lever 50 moves inward under the influence of the needle in the spiral groove, catch 39 will be raised until notch 37 (Fig. 19) is removed from abutment 36. This will permit throw-out lever 30 to drop through its own weight.

If the record being played has an eccentric circular groove 196 of Fig. 32 or any other form of irregular groove the needle will first move the pick-up arm inwardly and then outwardly as it follows this eccentric or irregular groove. As the record was being played the trip dog 71 pivoted to the end of pick-up arm lever 50 was pulled along under the notched surface of catch 39 (Fig. 19). As the needle swings inwardly during one turn of the eccentric groove 195 the trip slides along underneath the notches in catch 39 as during the playing of the record, but when the needle swings back through movement of the other portions of the eccentric groove the lever 39 is raised by the dog 71 in the movement of the pick-up arm 50 in the back direction. The raising of the lever 39 and the catch 37 drops the throw-out lever, as has already been described.

The dropping of this lever 30 brings about exactly the same action as when it was dropped by pushing the starting switch heretofore described. That is, it will throw the clutch into operative position and start the rotation of disk 26, cam 82 and slide 123 and bring about the discarding of the record and the playing of a new one thereon. The playing of the records and the discarding of the same will take place continuously until all of the records in the hopper have been played. When the last record has been played and there are no further records on the slide the discard and receiving operations will proceed as before described, but when the turntable is raised to its receiving position IV the slide will be moved over the table but it cannot place a record thereon. Therefore, as the table later is raised to playing position I there will be nothing to engage the needle in the pick-up arm and the latter will remain in the lowered position with switch 161 closed and switch 160 open. The sustaining circuit of the motor is therefore no longer closed through switch 160 and when the projection 58' of the clutch lever is snapped into depression 59' of disk 26 by tension of spring 33 clutch switch 31' is opened. There being no sustaining circuit the motor stops. For further playing the user will remove the records from the discard hopper 183 and place them in the supply hopper on slide 123 in any order desired, and with any arrangement of large and small size records as before.

If at any time the user of the instrument is dissatisfied with a record being played, starting button 79 may be pressed which will trip catch 39 through lever 75 causing the throw-out lever 30 to drop, thus closing the clutch and clutch switch. This will stop the playing of that particular record, bring about its discard and place a new record on the turntable. This stopping of the playing of an undesired record may be accomplished at any part of the playing cycle.

If the user desires a record to be continuously played, push button 108a will be moved to the left in slot 108' in platform or panel board 46, as shown in Fig. 1. This will move lever arm 109 to the left in Fig. 3 and will move plunger 84 until the ball snaps into groove 115. This shifts lift lever 83 until roller 87 abuts against dog 94' (Fig. 22) and slides projection 97 free of wall 100 in arm 101. In this position when the playing of a record has been completed the disk 26 and cam 82 as well as the pick-up arm 40 and pick-up arm lever 50 will go through all the movements previously described except that roller 87 on lift lever 83 cannot drop down to the discard surface 90 (Fig. 10) because driving arm 101 remains stationary. The roller rides now on surface 116 of the driving arm and is prevented from dropping below that level. The cam therefore will rotate the depression 90 past roller 87 while the turntable will be maintained in the swing-back position II. The played record thus is not discarded because it has not been brought into contact with discard rubber 92. As the turntable is raised in the receiving position IV no record is placed thereon from the slide because the slide did not move as the driving arm 101 was stationary. When the turntable is finally brought back into playing position I the played record is on the table and it is played over again. This repeating of the record will continue indefinitely until the repeat button 108a is brought back to the normal position.

The foregoing operation has been described with the assumption that a small size, say 10 inch record, was placed from the slide to the turntable. If the bottom record in the hopper resting on the slide 123 happens to be a large size, say 12 inch record, the action will be as follows:

As the slide is moved to the right in Fig. 4 the point of application of the force to the slide will be definitely set at point 120 by engagement of stud 127 in depression 126 of link 124. The slide will therefore be moved to the right in the same way as if a 10 inch record were in place thereon until the large size record engages the inner ends 143 and 144 of centering levers 132 and 131. Movement of the slide will cause the large size record to be centered against the wedges 130 on the slide. After the record has been thus centered continued movement to the right will push the levers 131 and 132 outwardly. Movement of lever 132 has no further function, but movement of lever 131 brings cam surface 145 on the rear end into engagement with cam surface 148 on link 124. After this engagement takes place further movement of the slide to the right forces link 124 downward in Fig. 4 until stud 127 leaves depression 126 and enters slot 125. Movement of the slide 123 then discontinues until the driving operation brings the left-hand end of slot 125 of link 124 into engagement with stud 127. When this takes place there can be no further movement between lever 121 and the slide 123. Further movement of driving arm 118 therefore moves lever 121 and slide 123 together. This regulation is arranged to shorten the movement enough to bring the large size record over the turntable with its central hole in line with the receiving pin 13' as the table is raised to the elevated position IV.

The large size record has thus been placed on the turntable but there remains yet to bring a compensating action into play to stop the return of the pick-up arm short of its normal movement so that it will rest on the edge of the large size record. This is brought about by compensating trip 64 (Fig. 2). As the large size record 66 and the turntable are lowered to swingback position the record will engage the trip 64 and pivot it about point 65 (Figs. 27 and 28). This will move the catch 64' out of the circular groove 63' in rod 63 and will permit it to fall under influences of weight 62' at the lower end. When the weight falls it places tension on cable 61 and pulls lever 51 over to the right in Figs. 1 and 14 and keeps the left-hand surface of slot 55 always in engagement with stud 59 as disk 20 rotates. This causes the stud 59 to enter depression 56 in the end of link 51 during the last quarter of its movement and since this is at a greater distance from pivot point 52 than depression 57, pick-up arm lever 50 and attached pick-up arm 40 are swung inward towards the turntable a less amount. The notches 56 and 57 are so spaced in respect to the distance from pivot point 52 as to bring about the positioning of the needle in the pick-up arm to the correct place for large and small size records. As the 12 inch record is played the same action will take place as previously described in connection with the 10 inch record. As the arm 51 is pulled inwardly during the operation just described, cable 61 pulls weight 62' and rod 63 back into normal position until the circular groove engages the catch in catch 64'. The 12 inch regulator arrangement is thus set back into position after each tripping action.

If a large size record is on the turntable when the repeat button is moved for repetition of the playing as already described, the record on the turntable will engage trip 64 and bring the compensating action into play to stop the pick-up arm so that the needle will rest adjacent the beginning of the sound groove.

In the return movement of slide 123 the slide will remain stationary while arm 121 and link 124 are moved to the left in Fig. 4 until stud 127 reaches the end of the slot 125 and is snapped into notch 126 by spring 201. Further movement of arm 121 thereafter moves the slide 123 to the left. It will thus be seen that the 12 inch regulation lever 124 and the 12 inch compensating lever 64 are set to normal position before another record is placed on the turntable. If a 10 inch record is the next one on the slide the operation will be as first described. If another 12 inch record is put on the slide the operation last described will take place. It will thus be apparent that a promiscuous arrangement of large and small records will be automatically played in the instrument.

It has been found that when no preventive means are used the spring pressure against centering levers 131 and 132 occasionally snaps the large size record forward as the levers descend on the back circumference of the record during the latter movements thereof and thus pushes the record beyond the desired position over the turntable. To prevent this action it is preferable to use V-shaped cams 147 and 148. Just after the ends 143 and 144 of the centering levers pass the maximum travel they engage these V-shaped cams and are prevented from turning inwardly until they pass beyond the rear ends of the cams at which time they snap inwardly but at that time the large size record on slide 123 has moved to a position where the centering levers are out of contact with the record and the record thus remains in contact with the back surfaces 130 on the slide and its correct position has not been disturbed.

It will be noted that I do not use the rather delicate force of the needle to close the motor switch. I use such movements to operate a trip and the trip lever closes the clutch and motor switch by energy previously stored up by the movements of the motor itself. Likewise the energy from the motor is stored up in spring 33 to open the clutch and switch.

On the movement of the slide to the right in Figs. 5 and 6, clearance 149 between the front cross piece of the hopper and the slide 123 is only sufficient to permit the bottom record to pass through. The other records are thus held in the hopper.

It will be understood that the phonograph apparatus described herein will be placed in any cabinet to suit the desires of the manufacturer or the public, but since the cabinet is no part of my invention I have shown only a few of the supporting pieces inside the cabinet to which the apparatus is attached. The automatic phonograph may be used alone in the cabinet or it may be incorporated in a cabinet with radio receiving apparatus where the same tubes may be used for audio amplification in radio reception and amplification of the pick-up currents of the phonograph. Also, the same power rectifying and supply apparatus may be used for both phonograph and the radio set. Such a combination is described in the application of Stuart W. Seeley, Serial No. 398,078, filed October 5, 1929, but since it is no part of my invention I refer herein to the combination only in general terms.

While I have shown a particular arrangement of parts to perform the automatic action of the phonograph it will be apparent that various modifications may be devised without departure from the spirit of the invention.

Having described my invention, what I claim is:

1. In phonographs, a record table, a record hopper, a movable slide forming a bottom support for the records in said hopper, and means to move said slide to bring the bottom record over the record table.

2. In phonographs, a record table, a record hopper, a base for supporting the records in said hopper, means on said base to engage the edge of the bottom record, means for moving the base to position the bottom record over said table, and means to prevent the remaining records from moving therewith.

3. In phonographs, a hopper for records, a base in said hopper to support the records, positioning members forming a notch on said base adapted to engage the edge of the bottom record, and means cooperating with said members to center the bottom record on said base.

4. In phonographs, a turntable, a hopper for records, a slide beneath said hopper having a V-shaped notch, means for moving said slide, and arms engaging the edges of a record to center it in the notch as the record is moved toward the turntable.

5. In phonographs, a turntable, a hopper adapted to contain large and small records, a slide, means for moving the slide a certain distance to position the smaller records over the turntable, and means operated by a large record when moved by the slide to cause it to move to another distance over the table.

6. In phonographs, a rotatable table adapted to hold a record, means to rotate said table in playing position, a projection at one side of said table, a pick-up arm, means to lower said table, means to move said pick-up arm while the table is thus lowered, and means to further lower the table to bring the record into engagement with said projection and tilt the record above the table whereby the rotation of the table causes the record to roll therefrom, and means to raise the said table above its playing position to receive a record.

7. In phonographs, a rotatable table adapted to hold a record, means to rotate said table, a projection at one side of said table, a pick-up arm, means to lower said table, means to move said pick-up arm while the table is thus lowered, and means to further lower the table to bring the record into engagement with said projection and tilt the record above the table whereby the rotation of the table causes the record to roll therefrom, means to raise the said table above its normal playing position to receive a record, means to lower the said table below the normal playing position, and means to move the pick-up arm towards the record.

8. In phonographs, a rotatable table adapted to hold a record, means to rotate said table, a projection at one side of said table, a pick-up arm, means to lower said table, means to move said pick-up arm while the table is thus lowered, and means to further lower the table to bring the record into engagement with said projection and tilt the record above the table whereby the rotation of the table causes the record to roll therefrom, means to raise the said table above its normal playing position to receive a record, means to lower the said table below the normal playing position, means to move the pick-up arm towards the record, and means to raise the said table into normal playing position.

9. In phonographs, a hopper for records, a turntable, a slide beneath said hopper, means for moving the slide to remove the bottom record from said hopper and place it over the turntable, and means to raise the turntable to engage the record.

10. In phonographs, a hopper for records, a turntable, a center pin in the turntable, a slide adapted to remove a record from the hopper and having a slot, means to move said slide and record over the turntable, and means to raise the turntable and extend the center pin through the slot and into the center hole of the record.

11. In phonographs, a motor, a cam, a table operated by the motor, means whereby said table is raised and lowered by said cam, an arm adapted to rotate coaxially with said cam, record changing apparatus operated by said arm and a clutch normally connecting said arm to move with said cam and means for disconnecting said clutch at will.

12. In phonographs, an electric motor, a table rotated by said motor and adapted to contain a record to be played, a pick-up adapted to cooperate with said record during the playing operation, means for connecting said motor to the pick-up to move it away from and towards said record, a switch in the circuit of said motor, means on the pick-up for opening said switch while the pick-up is being thus moved and means to raise the turntable and a record thereon to cause said pick-up to close said switch.

13. In phonographs, an electric motor, a table rotated by said motor and adapted to contain a record to be played, a pick-up adapted to cooperate with said record during the playing operation, means for connecting said motor to the pick-up to move it away from and towards said record, two switches in the circuit of said motor, means for opening one of said switches when the pick-up has been brought to playing position above said record means to raise the turntable toward the pick-up, and means for closing the other of said switches by movement of the pick-up by the table when supporting a record thereon.

14. In phonographs, an electric motor, a table adapted to contain a record and operated by said motor, an arm containing a pick-up, a clutch adapted to connect said motor to said arm to move it away from and towards the record and to said table to lower and raise it, a switch in the circuit of said motor, manual means for closing said switch and a second switch in parallel with the first switch and in open position while said arm is being moved by the motor and closed by movement of said pick-up by a record on the turntable when raised by the motor.

15. In phonographs, an electric motor, a table adapted to contain a record and operated by said motor, an arm containing a pick-up adapted to cooperate with the record, a rotatable member connected to said arm, a clutch for connecting and disconnecting the motor to said rotatable member, a manual switch biased to open position in the circuit of said motor to start the same, means to close the clutch by operation of the manual switch, a second switch closed by the closing of said clutch to sustain the circuit when the manual switch returns to open position.

16. In phonographs, an electric motor, a table adapted to contain a record and operated by said motor, an arm containing a pick-up adapted to cooperate with the record, a rotatable member connected to said arm, a clutch for connecting and disconnecting the motor to said rotatable member, a manual switch biased to open position in the circuit of said motor to start the same, means to close the clutch by operation of the manual switch, a second switch closed by the closing of said clutch to sustain the circuit when the manual switch returns to open position, a third switch in the circuit of said motor adapted to be closed by vertical movement of said arm when it contacts with the record on said table.

17. In phonographs, an electric motor having a plurality of coils, a table adapted to contain a record and operated by said motor, a manually operable switch, biased to open position, for initial closing of the motor coils in parallel, and a switch operated by the opening of said first mentioned switch to connect said motor coils in series.

18. In phonographs, an electric motor, a table adapted to contain a record and operated by said motor, an arm containing a pick-up adapted to move both in vertical and horizontal planes, means for connecting the motor to said arm to move it in a horizontal plane, a resistance, a switch operated by said means to place the resistance in circuit with said motor, and a switch operated by movement of said arm in a vertical plane to short-circuit said resistance.

19. In phonographs, an electric motor, a table adapted to contain a record and operated by said motor, an arm containing a pick-up pivoted to move in both vertical and horizontal planes, means for connecting said arm with the motor to move it in a horizontal plane, means to lower and raise said table, a switch adapted to be closed by said means, a switch in parallel with the first mentioned switch operated by said arm when raised by a record on the table, and a third switch closed in series with said first mentioned switch when said arm is lowered by the record on said table.

20. In phonographs, an electric motor, a table adapted to contain a record and operated by said motor, a speed regulating resistance, an arm containing a pick-up pivoted to move both in vertical and horizontal planes, means for connecting said motor to said arm to move it in a horizontal plane and with the table to lower and raise said table, a switch operated by said means to place the resistance in circuit with said motor, a switch short-circuiting said resistance when no record is on the table and a switch moved by the record on said table to form a parallel circuit with the first mentioned switch.

21. In phonographs, an electric motor, a table adapted to contain a record and operated by said motor, means for raising and lowering said table from its normal playing position, a speed regulating resistance, a switch operated by the lowering of said table to short-circuit said resistance, and another switch operated on the raising of said table to place said resistance in the motor circuit.

22. In phonographs, an electric motor, a table adapted to contain a record and operated by said motor, means for connecting said motor to said table to lower and raise it from its playing position, a speed regulator for said motor, an arm adapted to contain a pick-up pivoted to be raised and lowered by said record, a switch operated by said arm when moved in one direction by the record to place said speed regulator in operative position, and a switch adapted to disconnect said regulator from operative position by movement of said arm in the other direction.

23. In phonographs, a motor record changing apparatus, a shaft adapted to be rotated by said motor, a turntable on said shaft, a rotatable arm connected to said apparatus, a dog connected to said shaft and adapted to connect said arm to said shaft, a lever having an abutment adapted to move said dog out of engagement with the arm, a slide connected to said lever, means to hold said slide in adjusted positions and means to move said slide.

24. In phonographs, a rotatable shaft, a motor, means to clutch said motor to said shaft to cause it to make one revolution record changing apparatus, a lever arm connected to move said apparatus, and means to connect said arm with said shaft to cause it to move outward and backward in substantially a half revolution of said shaft and to remain stationary the remaining part of the revolution.

25. In phonographs, a rotatable shaft, a motor, a turntable on said shaft, a slide adapted to place a record over said turntable, a lever arm connected to said slide, means to connect said arm with said shaft to move the slide and record over said turntable during substantially a quarter revolution of said shaft, and to remove the slide from under said record during the next quater of a revolution thereof.

26. In phonographs, a slide adapted to contain records, a lever arm pivoted at one end and connected to said slide and having an arcuate slot, a rotatable shaft passing through the center of the circle from which the slot is generated a crank arm on said shaft, means to connect the crank-arm to said slide and a pin in said crank arm and extending into said slot.

27. In phonographs, a turntable, a hopper, a slide beneath the hopper to support the records therein, a shaft extending at right angles to said slide and connected to move the slide over said turntable to deposit a record thereon and a universal bearing supporting said shaft.

28. In phonographs, a motor, a turntable, a hopper, a slide beneath the hopper, a lever connected to move said slide over the turntable to deposit a record thereon, a shaft connected to said motor, a yoke on said shaft and adjustable means on said yoke to engage said lever.

29. In phonographs, a hopper for records, a slide beneath the hopper, a lever to move said slide, means to connect said lever to move said slide one distance when a small size record is on the slide and a lesser distance when a large size record is thereon.

30. In phonographs, a hopper for records, a slide beneath the hopper, a lever, a link connected to said lever and having a slot with a notch in one end, a pin fastened to said slide and fitting into said notch, and means to move the pin out of said slot when a large size record is on the slide.

31. In phonographs, a supporting frame, a hopper for records, a slide on said frame and beneath the hopper, centering wedges on said slide, and a lever pivoted on said frame and adapted to move a record against said wedges.

32. In phonographs, a supporting frame, a hopper for records, a slide on said frame and beneath the hopper, centering levers pivoted on said frame and adapted to center a record on said slide, and means to hold said levers from returning to normal position until the record is moved beyond the ends of the lever.

33. In phonographs, a turntable, a supporting frame, a hopper for records, a slide on said frame and beneath the hopper, centering devices on said slide, means for moving said slide to remove a record from the hopper and place it on the turntable, levers pivoted to said frame and adapted to engage the record to move it against said devices, and lugs on said slide adapted to engage with said levers to hold them away from said record after it has been centered on the slide, and means to return the levers to normal position after the record has moved over the turntable.

34. In phonographs, an electric motor having two circuits with coils, a clutch for said motor, a trip device for the clutch, a movable rod adapted to engage said trip device, spring switch contacts in one of said circuits normally closed, spring switch contacts in the other of said circuits normally open, a cone on said rod adapted to open the first mentioned contacts and close the second mentioned contacts after said trip device has been engaged by said rod.

35. In phonographs, an electric motor having two circuits with coils, a clutch for said motor, a trip device for the clutch, a movable rod adapted to engage said trip device, spring switch contacts in one of said circuits normally closed, spring switch contacts in the other of said circuits normally open, a cone on said rod adapted to open the first mentioned contacts and close the second mentioned contacts after said trip device has been engaged by said rod, and a spring to move said rod away from the trip device.

36. In phonographs, a rotatable turntable having a center pin, a slide adapted to contain a record, means to move said slide over the turntable, means to raise said turntable until the pin enters the center hole of said record, said first mentioned means moving the slide away from the table while the latter is in elevated position.

37. In phonographs, a rotatable turntable having a center pin, a slide adapted to contain a record, means to reciprocate said slide over and off of the turntable, means to raise and lower the turntable, a stationary support at one side of the turntable, the operation of said two means being timed to place the slide and record over the turntable, before the table is raised, then to raise the table, after which the slide is withdrawn and to lower the turntable to engage the record with said support to tilt the record off of said center pin.

38. The method of operating a phonograph having a turntable, playing needle and record feeder which consists in moving the feeder with a record over the turntable, raising the turntable to receive the record, moving said feeder off of the turntable, lowering the turntable, and moving the needle in position over said record.

39. The method of operating a phonograph having a turntable, playing needle and record feeder which consists in moving the feeder with a record over the turntable, raising the turntable to receive the record, moving said feeder off of the turntable, and moving the needle in position over said record.

40. The method of operating a phonograph having a turntable, playing needle and record feeder which consists in moving the feeder with a record over the turntable, raising the turntable to receive the record, moving said feeder off of the turntable, moving the needle into position over said record to play the same, and after completion of the playing of the record, lowering the record against a stationary support at one side to tilt the record above the table to cause it to roll therefrom.

41. The method of operating a phonograph, having a turntable, playing needle and record feeder which consists in moving the feeder with a record over the turntable, raising the turntable to receive the record, moving said feeder off of the turntable, lowering the turntable, moving the needle into position over said record to play the same, and after completion of the playing of the record, lowering the record against a stationary support at one side to tilt the record above the table to cause it to roll therefrom.

42. In phonographs, a hopper for records, a turntable, a slide serving as the bottom of said hopper, means for moving the slide to remove the bottom record from the hopper and position it over the turntable, and means to raise the turntable to engage the record.

43. In phonographs, a hopper for records, a turntable, a center pin in the turntable, a slide adapted to remove a record from said hopper and having a slot, means to move said slide and record over the turntable, and means to raise the turntable and extend the center pin through the slot and into the center hole of the record, said slide moving means adapted to move the slide away from the turntable while the latter is in elevated position.

44. In phonographs, a turntable, a cam having a depression, a lever connected to said turntable, record changing apparatus, a member connected to said cam to operate the record changing apparatus, a cam follower on said lever adapted to move into said depression to lower the turntable, to reject a record, means to disconnect said member from said cam to repeat the record, and means on said member to prevent the follower entering said depression when the member is disconnected from said cam.

45. In phonographs, a pick-up arm, a motor, mechanism for moving said pick-up arm, a clutch between the motor and the mechanism, a lever adapted to close and open the clutch, a trip to hold the lever in position to maintain the clutch open, and means connected to said pick-up arm to move the lever into engagement with said trip.

46. In phonographs, a motor, a pick-up arm, a clutch adapted to cause the motor to move said arm, means operated by the motor for holding said clutch in closed position during a predetermined number of revolutions of said motor, a lever to open and close the clutch, a throw-out lever having an arm adapted to engage the end of the clutch lever and close the clutch, a spring between the clutch lever and the throw-out lever, and means to move the throw-out lever to energize said spring to cause it to open the clutch when said predetermined number of revolutions have been completed.

47. In phonographs, a turntable, a hopper for records, a slide adapted to remove a record from said hopper, a link having a slot with a notch at one end, a pin on said slide positioned in said notch, means for moving said link to move the slide through said pin and notch, and means operated by a large sized record on said slide to cause said pin to leave the notch and enter the slot whereby with large sized records the slide is moved into position over the turntable by the pin engaging the other end of the slot.

48. In phonographs, a motor, a turntable, a hopper slide, a lever connected to move said slide over the turntable, a shaft connected to the motor, a yoke on said shaft, set screws on each arm of said yoke to engage opposite sides of said lever.

49. In phonographs, a turntable, a slide having a record thereon positioned above the turntable, means to raise the turntable until the center pin enters the hole on the record, and means to withdraw the slide while the center pin holds the record.

50. In phonographs, a rotatable member having an elevation and a depression forming a cam surface, a second rotatable member concentric to the first member, a cam follower adapted to follow said cam surface and an extension on the second member adapted to prevent the said follower entering the depression on said cam surface when the two members rotate relatively to each other.

51. In phonographs, a rotatable member having an elevation and a depression forming a cam surface, a second rotatable member concentric to the first member, a cam follower adapted to follow said cam surface and an extension on the second member adapted to prevent the said follower entering the depression on said cam surface when the two members rotate relatively to each other but permitting it to enter the same when the two members rotate together.

52. In phonographs, a rotatable member having an elevation and a depression forming a cam surface, a second rotatable member concentric to the first member, a cam follower adapted to follow said cam surface and an extension on the second member adapted to prevent the said follower entering the depression on said cam surface when the two members rotate relatively to each other, and means to cause said two members to rotate in unison and permit said follower to enter the depression.

53. In phonographs, a turntable, a feeder adapted to place records above said table, a rotatable member having a cam surface for raising and lowering said table, a second rotatable member adapted to move said feeder and means on the second member adapted to prevent said means from following certain portions of said cam surface when there is relative rotation between the members.

54. In phonographs, a turntable, a feeder adapted to place records above said table, a rotatable member having a cam surface for raising and lowering said table, a second rotatable member adapted to move said feeder and means on the second member adapted to prevent said means from following certain portions of said cam surface when there is relative rotation between the members and to permit it to follow said surface when both members rotate.

55. In phonographs, a turntable, a feeder adapted to place records above said table, a rotatable cam, a cam follower engaging the cam and connected to move the said table longitudinally of its axis, a crank arm pivoted to rotate concentrically of the axis of the cam, an extension on said crank arm adapted to prevent the following engaging certain portions of said cam when the cam rotates and the crank arm is stationary, and means to clutch the crank arm to the cam to move the feeder and permit the follower to engage the entire surface of the cam.

56. In phonographs, a turntable, a feeder adapted to place records above said table, a rotatable cam, a cam follower engaging the cam and connected to raise and lower the table, a crank arm pivoted coaxially with the cam adapted to move the feeder to place a record on the table, an arcuate extension on the arm extending above the plane of the lower part of the cam surface, means to clutch the arm to the cam with the extension radially opposite the higher portions of the cam surface to move the feeder and permit the follower to engage the entire surface of the cam, and a repeat control to unclutch the arm from the cam in position to prevent the follower from contacting with the said lower portions of the cam.

57. In phonographs, a motor, a record transfer device, a clutch between the motor and the record transferring device, means operated by the motor for holding said clutch in closed position during a predetermined number of revolutions of said motor, a spring connected to the clutch and a lever connected to the spring whereby movement of the lever moves said clutch through the spring to open the clutch when said predetermined number of revolutions have been completed.

58. In phonographs, a turntable, a pivoted pickup arm, a needle connected to the pickup arm, a switch connected to said arm and means to raise the table to elevate said arm by a record on the table for closing the switch.

59. In phonographs, a motor, record changing apparatus, means to connect said motor to operate said apparatus, a pickup arm, a switch in the motor circuit, means to move said holding switch open during operation of the record changing apparatus, and means to elevate the turntable with a record positioned thereon to raise the pickup arm to open and close said switch.

60. In phonographs, a motor, a turntable, a hopper, a slide beneath the hopper to support the records therein, means to connect the motor to move said slide over the turntable and deposit a record thereon, and adjustable limit stops to prevent the overrunning of the slide.

61. An automatic phonograph comprising a phonograph circuit, a record turntable substantially smaller in diameter than the records to be played, a reproducer arranged for reciprocation across the record and toward and from the record, means to move the turntable and the record to be played upwardly into engagement with the reproducer, and a no-record switch operated by reciprocation of the reproducer toward and from the record for opening the phonograph circuit when no record is carried by the turntable, said switch being closed when a record raises the reproducer and opened when the reproducer is not raised by a record.

62. In phonographs, a pick-up arm pivoted to move in vertical and horizontal planes, means to move the pick-up arm in a horizontal plane away from playing position, a brake member operated by the pick-up arm in lowered position to apply a frictional resistance to movement of said arm in a horizontal plane and means to raise the turntable for engaging said pickup arm to release the brake.

63. In phonographs, a motor, a record transferring device, a clutch between the motor and said device, means operated by the motor for holding said clutch in closed position during a predetermined number of revolutions of the motor, a pivoted arm, a spring having one end connected to the clutch and the other end to said arm, and means operated by the motor to move said arm and place tension on said spring for opening the clutch when said predetermined number of revolutions have been completed.

ARTHUR B. WINCHELL.